US005860784A

United States Patent [19]
Schuitema et al.

[11] Patent Number: 5,860,784
[45] Date of Patent: Jan. 19, 1999

[54] HIGH VOLUME CONVEYOR ACCUMULATOR FOR WAREHOUSE

[75] Inventors: Dennis J. Schuitema, Ada; Ricardo N. Schiesser, Grandville, both of Mich.

[73] Assignee: Mannesmann Dematic Rapistan Corp., Grand Rapids, Mich.

[21] Appl. No.: 746,017

[22] Filed: Nov. 5, 1996

[51] Int. Cl.$^6$ ...................................................... B65G 1/10
[52] U.S. Cl. ........................... 414/280; 414/281; 414/331
[58] Field of Search .................................. 414/268, 269, 414/280, 281, 285, 331

[56] References Cited

U.S. PATENT DOCUMENTS

| | | | |
|---|---|---|---|
| 3,068,987 | 12/1962 | Franklin | 198/19 |
| 3,403,794 | 10/1968 | Lopez | 414/280 |
| 4,509,893 | 4/1985 | Nashimoto et al. | 414/280 |
| 4,983,091 | 1/1991 | Lichti, Sr. et al. | 414/331 |
| 5,018,927 | 5/1991 | Tanaka | 414/331 |
| 5,056,978 | 10/1991 | Grafe et al. | 414/280 |
| 5,199,547 | 4/1993 | Boldrini et al. | 198/463.2 |
| 5,246,332 | 9/1993 | Benrad, II et al. | 414/786 |
| 5,273,392 | 12/1993 | Bernard, II et al. | 414/331 X |
| 5,337,880 | 8/1994 | Claycomb et al. | 198/347.3 |
| 5,350,050 | 9/1994 | Franke | 198/347 |
| 5,362,197 | 11/1994 | Rigling | 414/331 X |
| 5,449,262 | 9/1995 | Anderson et al. | 414/331 X |
| 5,505,586 | 4/1996 | Lichti | 414/786 |
| 5,564,879 | 10/1996 | Noguchi | 414/268 |
| 5,595,263 | 1/1997 | Pignataro | 414/331 X |

FOREIGN PATENT DOCUMENTS 348085  7/1991  Japan .

OTHER PUBLICATIONS

*Horizontal Carousels Tackle the Big Jobs*, Material Handling Engineering, Jul.

*Primary Examiner*—James W. Keenan
*Attorney, Agent, or Firm*—Van Dyke, Gardner, Linn & Burkhart, LLP

[57] ABSTRACT

An active high volume storage and retrieval system provides an improved accumulator and package transfer devices. The storage and retrieval system includes a storage carousel having a plurality of spaced apart, horizontal storage tiers and a lift having a plurality of article supports for supporting articles to be delivered to or to be received from the storage carousel. A first conveyor is provided which delivers articles to the article supports of the lift assembly. A second conveyor is provided which receives articles from the article supports of the lift assembly. A first article transfer device is disposed adjacent the lift, which includes a plurality of injection pushers for pushing containers from the storage supports of the lift onto storage tiers of the carousel. A second article transfer device disposed adjacent the carousel. The second article transfer device includes a driver beam and a plurality of ejection pushers, with each ejection pusher aligned with one of the article supports. The driver beam is adapted for movement between a first position and a second position. The ejection pushers are releasably coupled to the driver beam such that when the driver beam is moved to the second position any of the ejection pushers, which are coupled to the driver beam, push the article on the associated storage tier onto one of the article supports. Preferably, at least one of the ejection pushers is selectively, releasably coupled to the driver beam by a magnetic coupler. More preferably, the ejection pushers are selectively, releasably coupled to the driver beam by an electromagnetic coupler. In this manner, the ejection pushers may be selectively driven by the driver beam to push selected articles from the carousel to the lift.

71 Claims, 13 Drawing Sheets

HIGH VOLUME CONVEYOR ACCUMULATOR FOR WAREHOUSE

BACKGROUND OF THE INVENTION

The present invention relates generally to automated distribution systems for storing and retrieving goods in a warehouse. More particularly, the invention relates to a high volume conveyor accumulator and container driver assemblies for delivering articles/containers to and retrieving articles/containers from a storage carousel.

In conventional high volume storage, containers are stored on pallets. The pallets are stored on shelves of a storage rack until such a time that a container on the pallet is needed. To store a container or containers, a pallet is retrieved from the storage rack by a stacker truck or crane or forklift. The container or containers is then placed on the pallet, which is then returned to the storage rack by the stacker truck. Retrieval of a container requires unloading of the pallet, which holds the container, from the rack by the stacker truck and removing the container from the pallet. Then the container is delivered to a desired location, either by the stacker truck or on a conveyor, where it can be loaded onto a delivery truck or other means of transportation. Unless the pallet is cleared of all containers, the pallet is then replaced back in the storage rack.

The draw backs to the conventional rack and pallet system are numerous. Although somewhat automated through the use of stacker trucks and forklifts, the process is slow and arduous. A stationary rack and pallet system tends to be the bottle neck of any warehouse. An efficient storage and retrieval system should have the ability to store and retrieve a wide variety of goods housed in a wide variety of containers and to rapidly and effectively dispense the retrieved items and provide reasonable access to the stored containers.

Other proposed warehousing and distribution systems have incorporated a moving carousel. The carousel is indexed so that a shelf supporting the desired container can be moved to a retrieval location where the container can be retrieved from the shelf or so that an empty shelf can be moved to a delivery location where a container can be delivered to and placed on the empty shelf for storage on the carousel. However, since carousels tend to be large, weighing up to a couple hundred tons, stopping and starting the carousel requires a great amount of energy and exerts a significant strain on the system and the individual parts of the carousel. To overcome these problems, some carousels have been designed to continuously move. Retrieval and delivery of the containers from the continuously moving carousel is accomplished by means of equipment which deposits the containers onto the shelves of the moving carousel or grabs the containers from the shelves of the moving carousel without disturbing the carousel or the adjacent containers. Typically, these continuously moving carousels employ "totes", which are smaller than pallets but still require the container to be removed from the tote and the tote replaced back on the carousel. Furthermore, the "totes" limit the size of the containers that can be stored on the carousel.

For example, in U.S. Pat. No. 5,505,586 to Lichti, a high speed storage system is disclosed, which includes a storage carousel and a vertical conveyor. The shelves of the conveyor and the vertical lift include irregular side edges to accommodate the forks of the shuttle unit, which transfers the articles to and from the lift and carousel. These irregular side edges restrict the size of the containers supported thereon and, therefore, limit the scope of application.

In U.S. Pat. No. 4,983,091 to Lichti, Sr. et al., a "toteless" storage carousel and delivering and retrieving mechanisms for inserting and extracting containers from the carousel while it is continuously moving are disclosed. Containers are transferred to the carousel by a shuttle which includes gripping arms. The gripping arms as disclosed, however, limit the size of the packages on the carousel.

SUMMARY OF THE INVENTION

The present invention provides an improved high volume storage system utilizing a carousel and a mechanism for delivering articles to and retrieving articles from the carousel.

In one aspect of the invention, an active high volume storage and retrieval system includes a storage carousel having a plurality of spaced apart, horizontal storage tiers and a lift having a plurality of article supports for supporting articles to be delivered to or to be received from the storage carousel. An incoming conveyor is provided which delivers articles to the article supports of the lift assembly. An outgoing conveyor is provided which receives articles from the article supports of the lift assembly. An article inserting transfer device is disposed adjacent the lift, which includes a plurality of insertion pushers, with each insertion pusher aligned with one of the article supports for transferring an article supported thereon onto the carousel. An article ejecting transfer device is disposed adjacent the carousel, which includes plurality of ejection pushers, with each ejection pusher aligned with one of the horizontal storage tiers for transferring an article supported thereon onto the lift. The driver beam is adapted for movement between a first position and a second position wherein the driver beam moves with a driving motion between the first and second positions. The ejection pushers are releasably coupled to the driver beam such that when the driver beam is moved to the second position any of the ejection pushers, which are coupled to the driver beam, push the article on the associated horizontal storage tiers onto one of the article supports. Each of the ejection pushers may be releasably coupled to the driver beam by a magnetic coupler, such as an electromagnetic coupler. The coupler serves as a fail-safe device to allow a pusher that encounters an obstruction to break away from the driver beam and may provide a selectivity device.

The article ejecting transfer device may include a transfer frame and a driver beam, with the driver beam and ejection pushers supported by the frame. Each of the ejection pushers includes at least one linear bearing track to provide a low friction sliding surface for the ejection pushers. The ejection pushers are supported on the linear bearing tracks, with the driver beam moving the ejection pushers in and out of the transfer frame on the linear bearing tracks. The transfer frame may be vertically positionable to allow use of the active high volume storage and retrieval system on a ground support surface with or without a pit.

The article insertion transfer device includes an insertion driver beam adapted for movement between a first position and a second position to drive the insertion pushers. Each of the insertion pushers is aligned with one of the article supports and are releasably coupled to the insertion driver beam such that when the insertion driver beam is moved to the second position any of the insertion pushers coupled to the insertion driver beam push an article on the associated article supports onto one of the storage tiers.

According to another aspect of the invention, an active high volume storage and retrieval system includes a storage carousel having a plurality of horizontal storage tiers and a lift positioned adjacent the storage carousel. The lift includes a lift frame and a plurality of article supports for supporting articles to be delivered or to be received from the storage carousel. The lift raises and lowers the article supports to align at least one of the article supports with one of the horizontal tiers, each of the article supports spanning a width wherein the width of the frame is less than or equal to the widths of the article supports. By reducing the width of the frame, the article supports can be positioned in closer proximity to the horizontal storage tiers and, thereby, minimize the gaps between the article supports and the storage tiers. An ejection group of article transfer devices are positioned adjacent the horizontal storage tiers for pushing articles stored thereon onto the article supports. An insertion group of article transfer devices are positioned adjacent the article supports for pushing article supported thereby onto the horizontal storage tiers. An incoming conveyor section delivers articles to the article supports of the lift assembly. An outgoing conveyor section receives articles from the article supports of the lift assembly.

The lift frame may include a driving device, such as a continuous drive chain, for raising and lowering the article supports, wherein the driving device moves the article supports in a continuous path around the lift frame to define a delivery side on one side of the lift frame and a receiving side on the other side of the lift frame. The article supports couple to the drive chain such that when the drive chain is driven, the article supports travel around the lift frame along the continuous path defining delivery article supports when aligned on the delivery side and receiving article supports when aligned on the receiving side. The lift frame may include a pair of spaced apart tracks extending around the lift frame along the continuous path for guiding the article supports around the lift frame. The article supports are adapted to be guided around the continuous path on the track to align a first group of article supports on the delivery side of the lift frame and a second group of article supports on the receiving side of the lift frame.

The horizontal tiers may each include a tier free-edge and each of the shelf elements include a shelf free-edge facing the tier free-edge of an associated horizontal tier. Each of the tier free-edges are spaced from respective shelf free-edges a distance less than or equal to about ½ inch.

According to yet another aspect of the invention, an active high volume storage and retrieval system includes a storage carousel, a lift positioned adjacent the storage carousel, an incoming conveyor section for delivering articles to an article delivering portion of the lift, and an outgoing conveyor section for receiving articles from an article receiving portion of the lift. A plurality of article transfer devices are provided for transferring articles supported on the article supports in the article delivery portion to the horizontal tiers and for transferring articles stored on the carousel to selected article supports on the article receiving portion. The incoming conveyor section is provided for delivering articles to an upper delivery article support in the article delivering portion, and the outgoing conveyor section is provided for receiving articles from an upper receiving article support in the article receiving portion.

A package driver may be positioned adjacent the upper receiving article support for pushing articles supported thereon onto the outgoing conveyor section. The package driver moves unidirectionally in a continuous path. The package driver pusher may include a pusher arm adapted to move from a first retracted position adjacent the upper article support to a first projecting position over one side of the upper article support, to translate from the first projecting position along the upper article support to a second projecting position for pushing an article supported thereon onto the second conveyor section, and to move from the second projecting position to a second retracting position. The package driver may include a drive assembly, which includes a first set of pulleys and a second set of pulleys, each set of pulleys having a chord. Each of the chords extend around the pulleys of a respective set of pulleys defining a closed path. The pusher arm is coupled to the chords and is driven to move around the closed paths of the chords to move from the first retracted position to the first projecting position, from the first projecting position to the second projecting position, from the second projecting position to the second retracted position, and then back to the first retracted position.

In another aspect of the invention, an active high volume storage and retrieval system includes a storage carousel having a plurality of storage surfaces arranged vertically and horizontally to form a plurality of spaced apart, horizontal storage tiers and a lift having a plurality of article supports for supporting articles to be delivered to or to be received from the storage carousel. The lift raises and lowers the article supports to align a delivery group of selected article supports with a receiving group of selected storage surfaces and a receiving group of article supports with a delivery group of selected storage surfaces of the carousel. Incoming and outgoing conveyors are provided for delivering containers to the delivery article supports of the lift assembly and for receiving containers from the receiving article supports of the lift assembly. An insertion container driver is disposed adjacent the delivery article supports of the lift. The insertion container driver includes a plurality of insertion pushers aligned with the delivery article supports for pushing the containers from the delivery article supports onto the receiving group of the storage surfaces. An ejection container driver is disposed adjacent the delivery group of the storage surfaces of the carousel. The ejection container driver includes a plurality of ejection pushers for selectively pushing containers from the delivery group of storage surfaces onto the receiving article supports.

The carousel includes pair of generally parallel side sections and two opposed curved, end sections, the side sections and end sections forming a continuous path. The lift may positioned adjacent one of the side sections or adjacent one of the end sections.

As will be understood, the active high volume storage and retrieval system of the present invention provides numerous advantages over prior known high volume storage and retrieval systems. The injector and ejector pusher assemblies of the present invention may provide for selective transfer of containers/articles between the carousel and the accumulator lift assembly with the use of selectively, releasable couplers, which couple the respective pushers to a driver member. Furthermore, the releasable couplers provide a safety mechanism. If a pusher encounters an obstruction or an obstructed package, the resistive force of the obstruction will exceed the coupling force of the coupler and, consequently, the pusher will decouple from the driver member. This significantly reduces the frequency of crushed containers. Furthermore, the article supports of the present invention are supported inwardly of their respective distal side edges, thus reducing the width of the pusher assembly frame. This permits close alignment of the article supports with the storage tiers of the carousel which reduces the frequency of package jams. Also, the article supports of the present invention are preferably solid planar shelf elements having generally parallel straight side edges and, therefore, pose no restrictions on the container size or shape. Moreover, as the transfer of articles/containers from the conveyor to the lift assembly and from the lift to the carousel is direct, without the need for intermediate carriers, such as totes or pallets, the efficiency of the system is increased with respect to speed and scope.

These and other objects, advantages, purposes and features of the invention will become more apparent from a study of the following description taken in conjunction with the drawings.

DETAILED DESCRIPTION OF THE PREFERRED EMBODIMENTS

Figure 1:
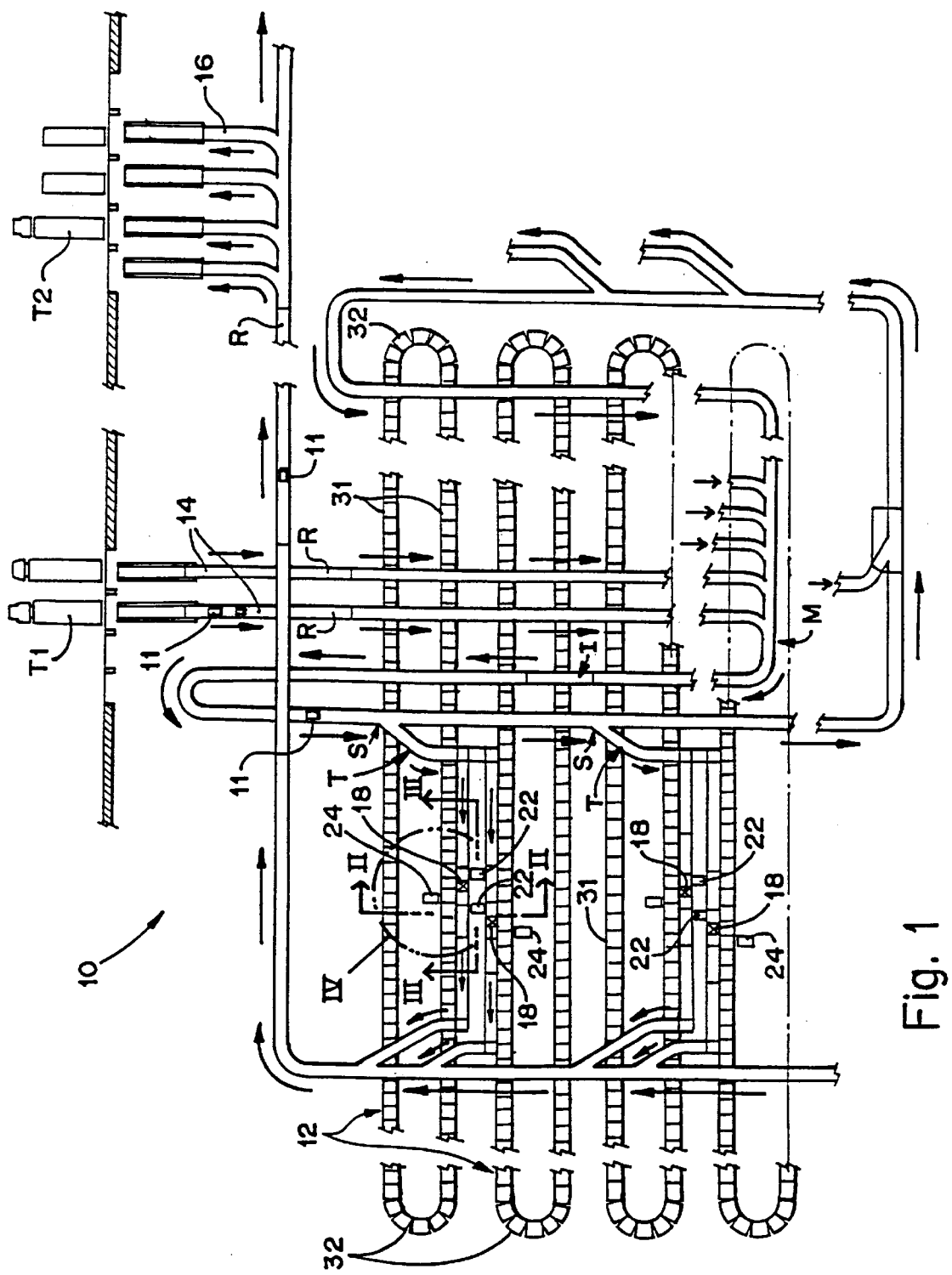
FIG. 1 is a plan view of a warehouse delivery and retrieval system of the present invention.

Referring now specifically to the drawings and the illustrative embodiments depicted therein, the numeral 10 generally designates an article handling system for a warehouse. Article handling system 10 includes an active high volume storage and retrieval system, which includes a storage carousel 12 and an insertion/retrieval assembly 13. The delivery and retrieval system delivers articles/containers 11 from incoming docks, where an inbound truck T1 delivers goods to the warehouse, to a plurality of storage carousels and retrieves containers 11 from storage carousels 12 to deliver the containers to an outgoing dock, where an outbound truck accepts the goods and transports them to their desired destination.

Article handling system 10 can accommodate both "door per store" and "batch" systems of operation. "Door per store" systems designate an outgoing dock for each store to which goods are to be delivered. A truck remains at the outgoing dock until all the goods that are to be delivered to the store are loaded onto the truck. As each outgoing dock is a designated dock, the cycle time for each delivery dock is low and, therefore, the time between goods arriving and being delivered is not critical. However, in "batch" systems the outgoing docks are not designated. Typically "batch" systems are used when the number of stores serviced by the warehouse exceeds the number of delivery docks. In "batch" systems, the cycle time of the outgoing dock is much higher and the incoming goods are designated the moment that they are delivered to the carousel. Therefore, the time between goods arriving and being delivered is preferably minimized so that the trucks at the outgoing docks are not held up by the handling system.

As best seen in FIG. 1, delivery and retrieval system 10 includes a plurality of incoming conveyors 14 and outgoing conveyors 16, which convey containers 11 to and from a plurality of lift assemblies 18. The articles/containers 11 on the incoming conveyors 14 are merged at a merger section M and then directed to an induction section I, where spaces are introduced between the packages to improve the control and handling of the articles/containers. After the induction section, articles/containers 11 are directed by sorters S to respective storage carousels 12, take away sections T direct the articles/containers 11 to the respective carousel for storage.

Preferably, incoming and outgoing conveyors 14 and 16 include ramp sections R to elevate portions of the conveyors 14 and 16 above carousels 12, which deliver and retrieve containers 11 to and from uppermost shelf elements 20 of lift assemblies 18. In this manner, the lengths of carousels 12 are not truncated by conventional power conveyors. Conventional power conveyors typically traverse the warehouse at or near ground level and follow a path between and around adjacent carousels and, therefore, reduce the available floor space on which the carousels can be supported and can extend.

Delivered containers 11 are transferred from incoming conveyor 14 to the lift assemblies 18 and then transferred from the lift assemblies 18 to carousels 12 by first package transfer device in the form of injection pusher assemblies 22. Containers 11 are transferred from incoming conveyor 14 to lift 12 either by the force of the incoming conveyor or, preferably by a package driver 25, which may be positioned adjacent the incoming conveyor 14. Retrieved containers 11 are transferred from the carousels 12 to lift assemblies 18 by second package transfer devices in the form of ejection pusher assemblies 24 and then transferred from the lift assemblies 18 to the outgoing conveyors 16 by a second package driver 25, as will be described in more detail below.

Figure 3:
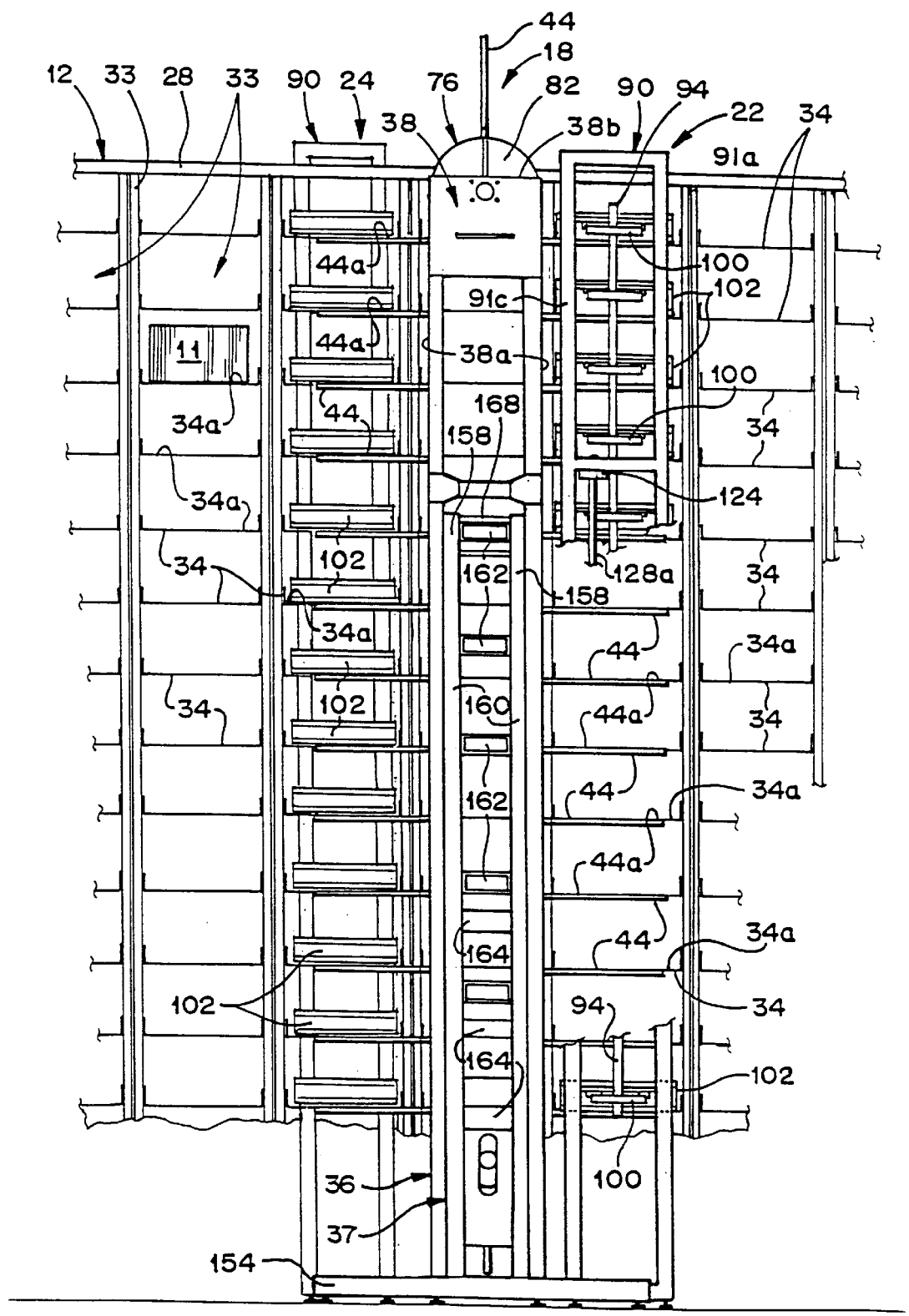
FIG. 3 is a sectional view taken along the line III—III in FIG. 1.
Figure 4:
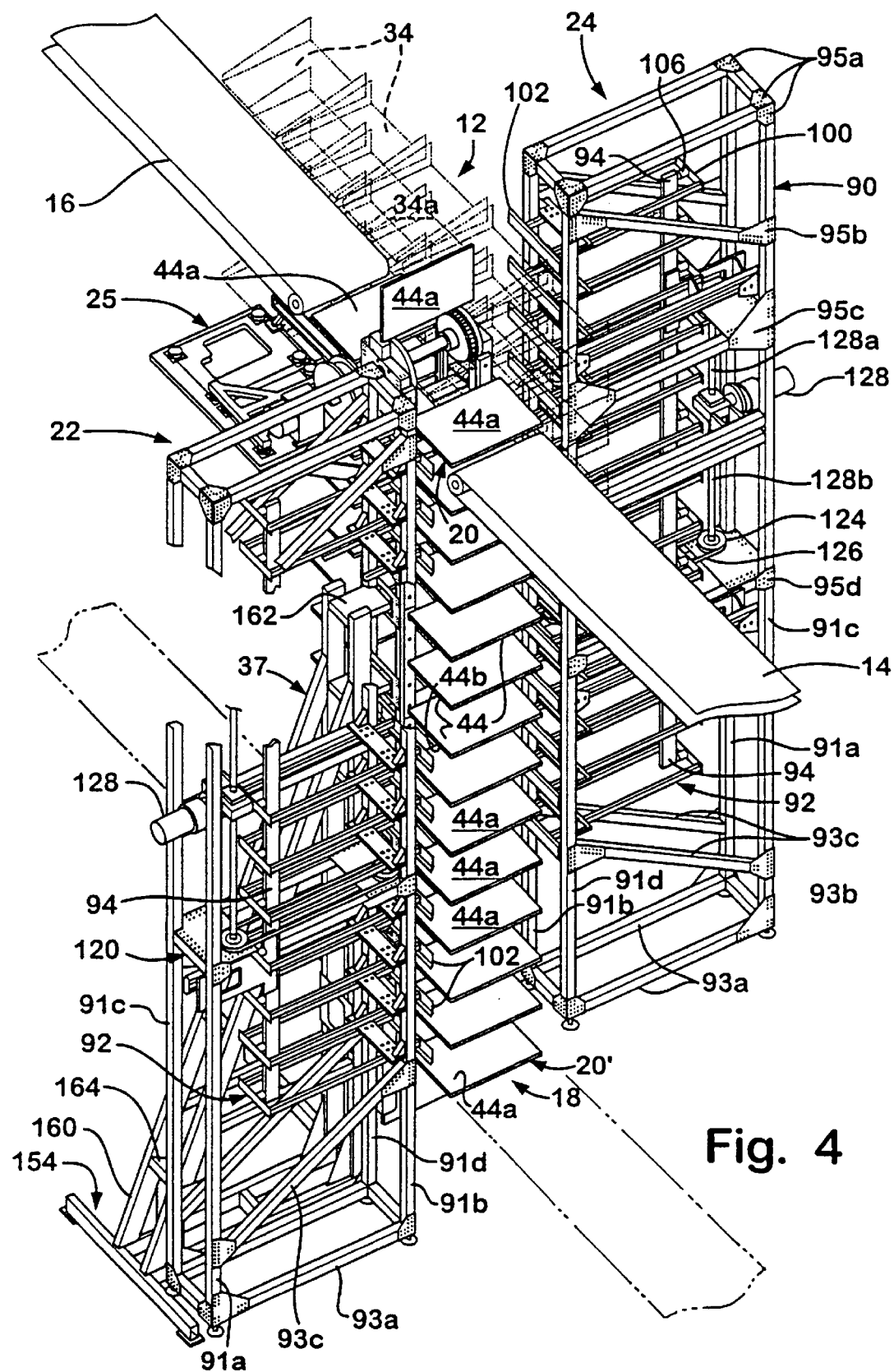
FIG. 4 is a perspective view of the lift assembly and injector and ejector pusher assemblies adjacent the carousel, including incoming and outgoing belt conveyors.

In the illustrated embodiment, storage carousels 12 comprise continuously moving carousels. As best seen in FIG. 3, each storage carousel 12 includes a horizontally traveling endless overhead conveyor 28 and a plurality of rack columns 33 suspended from conveyor 28 and guided by track 30, which provides lateral support for the free end of rack columns 33. Conveyor 28 moves rack columns 33 around an endless path formed by a pair of parallel straight side portions 31 and opposed end sections 32 (FIG. 1). Moving carousel speeds are typically in the range of about 2 to 10 feet per minute. Referring to FIG. 1, end sections 31 may be semi-circular in shape or may be curved with flared portions (FIG. 16), for example a "dog-bone" shaped end. This depends on whether carousel 12 is to be loaded and unloaded from side portions 31 or from end portions 32, as will be discussed in reference to lift assembly 18. Each rack column 33 includes a plurality of vertically spaced shelves 34 for storing articles/containers 11. The rack columns 33 are arranged in a side-by-side relationship so that the respective shelves 34 are arranged in horizontal tiers, one above the other as shown in FIGS. 3 and 4. Shelves 34 may comprise solid sheet metal trays with generally horizontal, planar support storage surfaces 34a. Preferably, shelves 34 provide smooth storage surfaces 34a that accommodate a wide range of article/container shapes and sizes. More preferably, storage surfaces 34a are solid to reduce the risk of package jams. Most preferably, storage shelves 34 include generally parallel, straight side edges to minimize the gaps/distance between adjacent support surfaces 34a. Shelves 34 may also comprise generally horizontal, planar storage shelves with raised rib portions.

Figure 2:
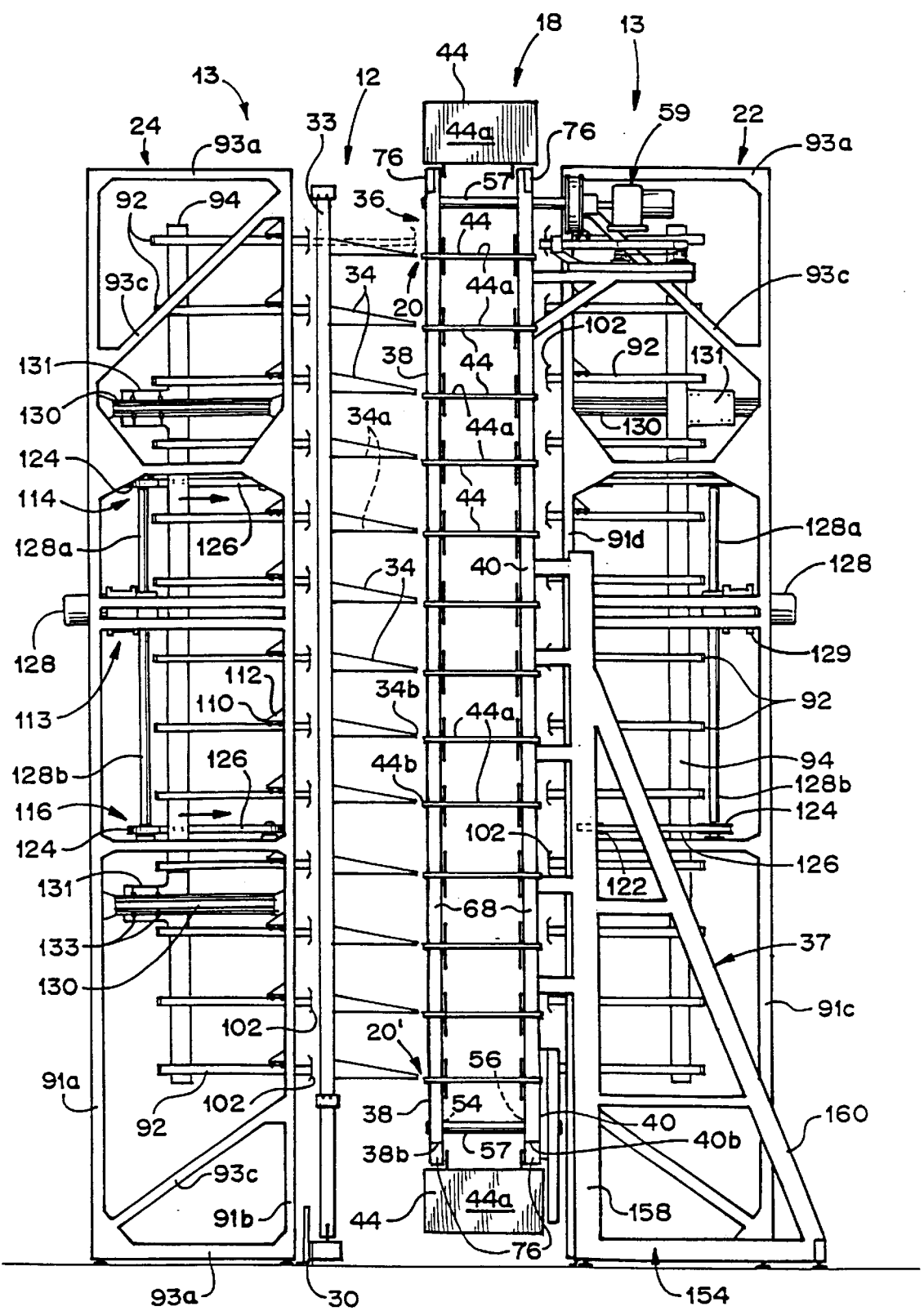
FIG. 2 is a partial sectional view taken along lines II—II in FIG. 1.
Figure 5:
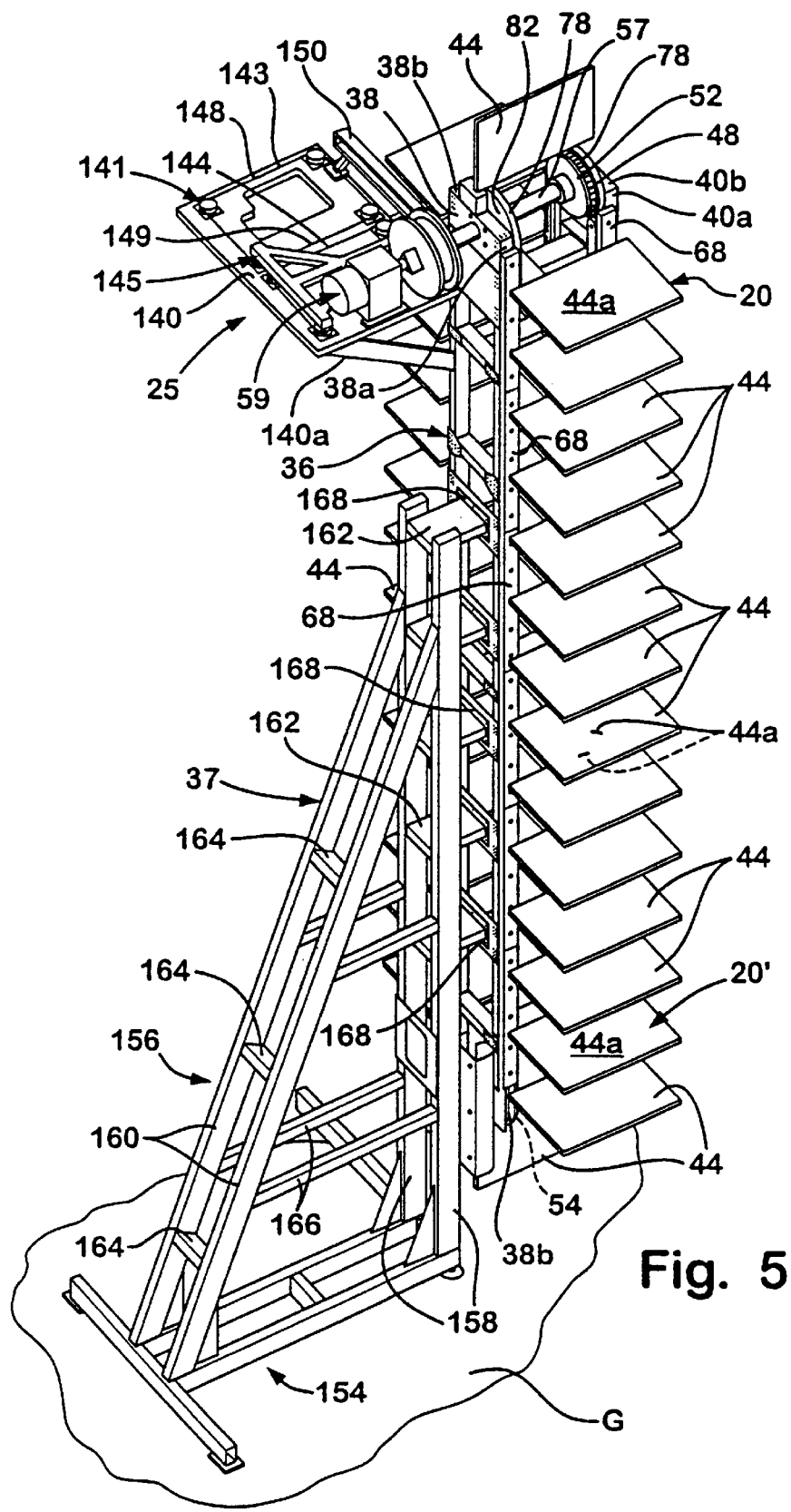
FIG. 5 is a perspective view of the lift assembly and a package driver assembly.

Lift assemblies 18 may be positioned adjacent ends 32 of carousel. Where lift assembly 18 is positioned adjacent end 32, end 32 preferably comprises a "dog-bone" shape so that lift assembly 18 can deliver and receive containers from a pair of generally co-linear storage shelves 34. Preferably, lift assembly 18 is position adjacent side 31 of carousel 12 so that the length of storage carousel 12 can be maximized. As best seen in FIGS. 2, 3 and 5, each lift assembly 18 includes a lift frame 36 and brace frame 37. Lift frame 36 includes a pair of spaced apart side walls 38 and 40, which are braced by cross-brace members 41, and a plurality of shelf elements 44 supported by side walls 38 and 40. Lift frame 36 also supports a drive system for shelf elements 44, as will be explained below. Shelf elements 44 are spaced vertically from one another to form a plurality of support surfaces 44a that provide support for articles/containers 11, which are to be transferred from lift assembly 18 to carousel 12 or from carousel 12 to lift assembly 18. Shelf elements 44 may comprise solid sheet metal trays with generally horizontal, upper and lower planar support storage surfaces 44a. The sheet metal may be bent in half to provide the upper and lower support surfaces 44a and to provide a smooth sloped distal edge 44c to ease the sliding of articles/containers 11 on and off shelf elements 44. Preferably, shelf elements 44 provide smooth support surfaces 44a that accommodate a wide range of article/container sizes and weights. More preferably, support surfaces 44a are solid to reduce the risk of articles/containers from getting snagged or jammed. Most preferably, shelf elements 44 include generally parallel, straight side edges 44b so that the gap/distance between shelf elements 44 and shelves 34 are minimized. Again, shelf elements 44 may also comprise generally horizontal, planar support shelves with raised rib portions.

Figure 7:
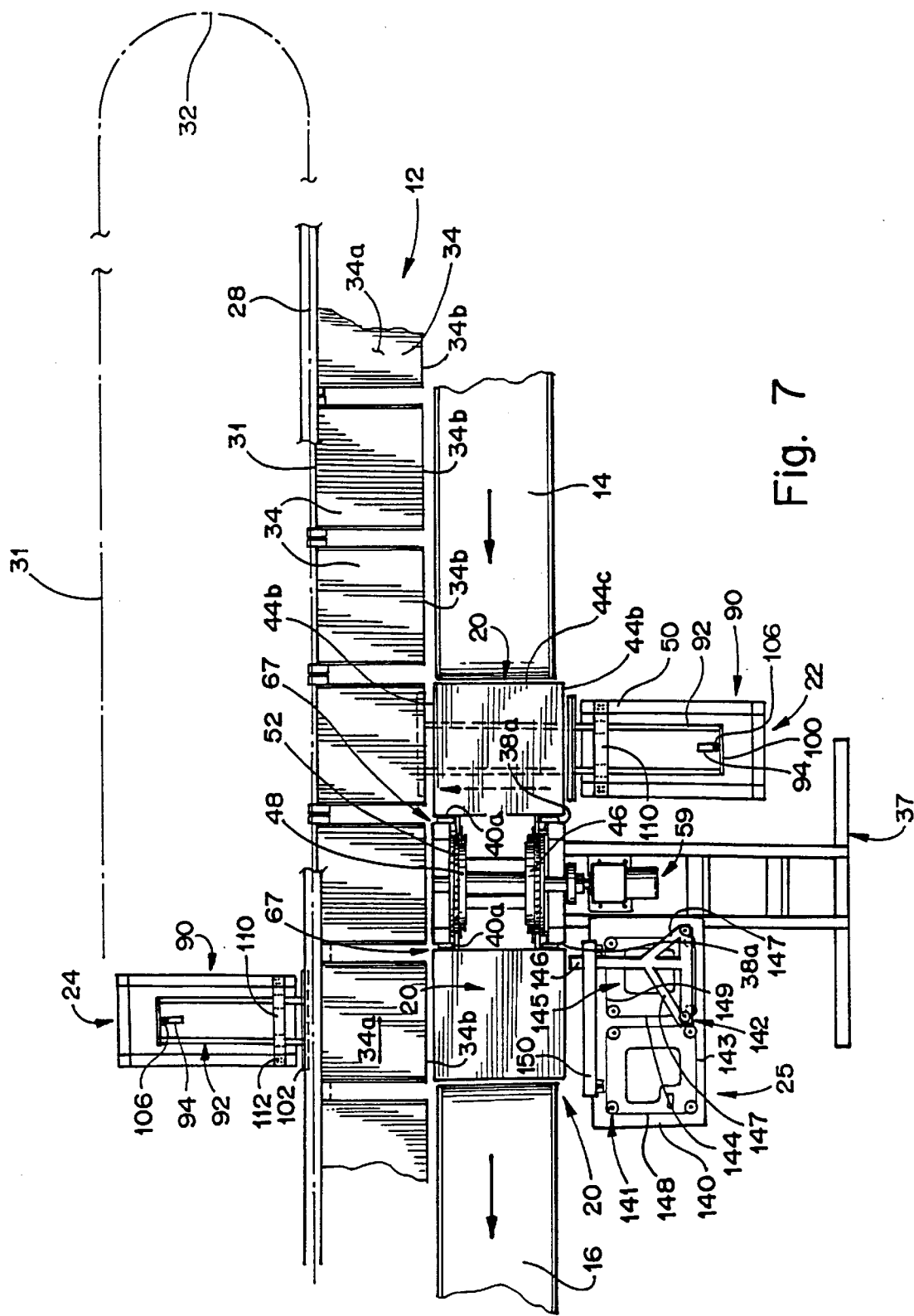
FIG. 7 is a top plan view of the lift and injector and ejector pusher assemblies, the carousel and incoming and outgoing conveyors illustrating the flow of the packages/containers to and from the carousel.
Figure 8:
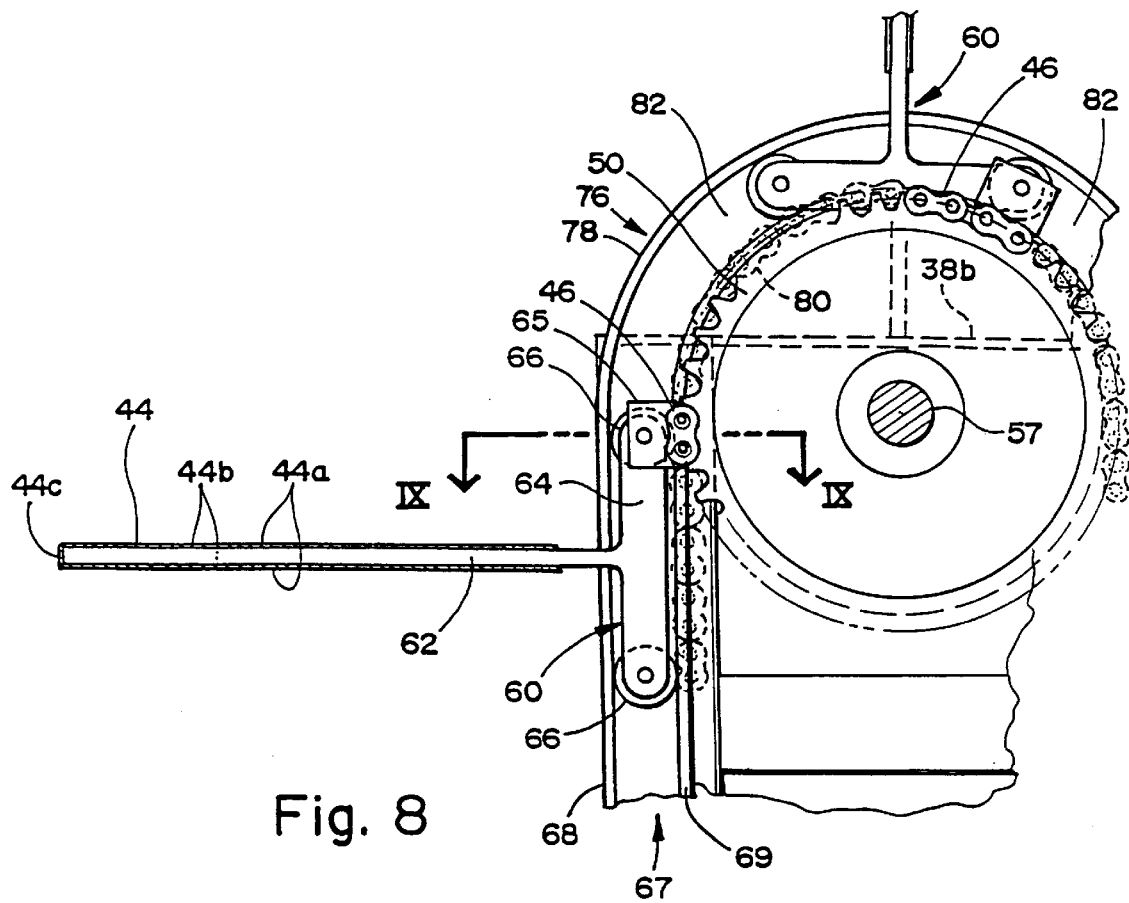
FIG. 8 is an enlarged partial cross-sectional view of the lift assembly shelves coupled to a pair of drive chains.
Figure 9:
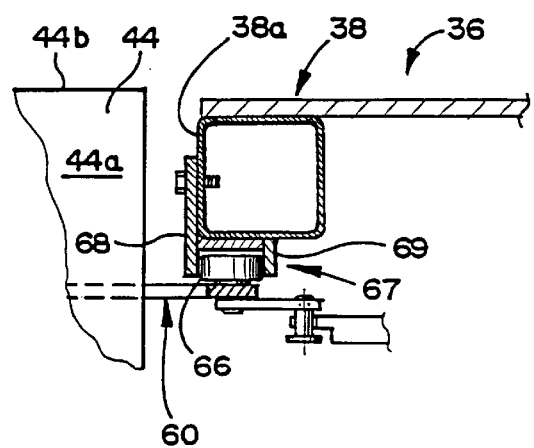
FIG. 9 is a partial sectional view taken along line IX—IX of FIG. 8.
Figure 10:
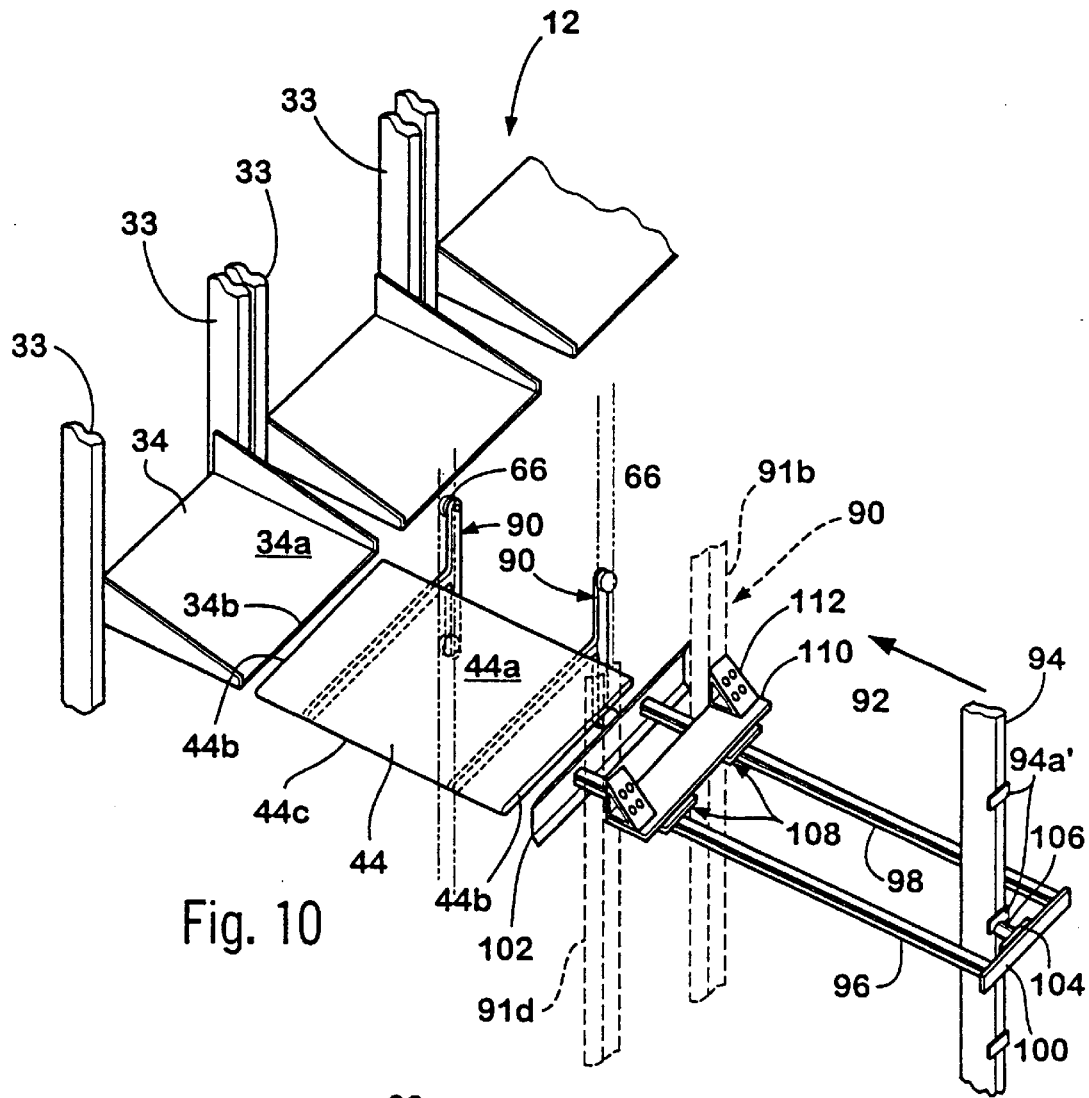
FIG. 10 is perspective view of one pusher frame positioned aligned with one lift assembly article support/delivery shelf, and one carousel storage shelf.
Figure 11:
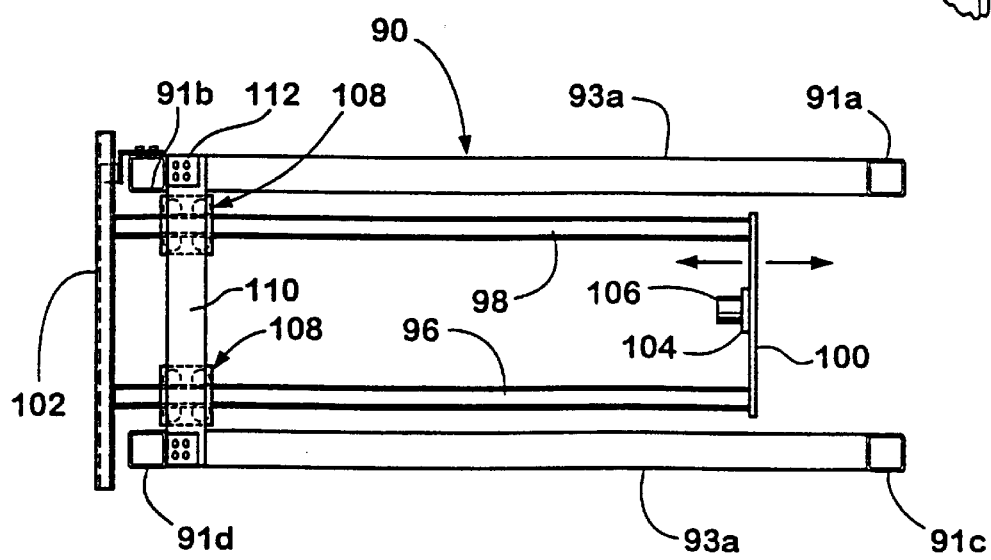
FIG. 11 is a top plan view of one of the pusher assemblies.
Figure 12:
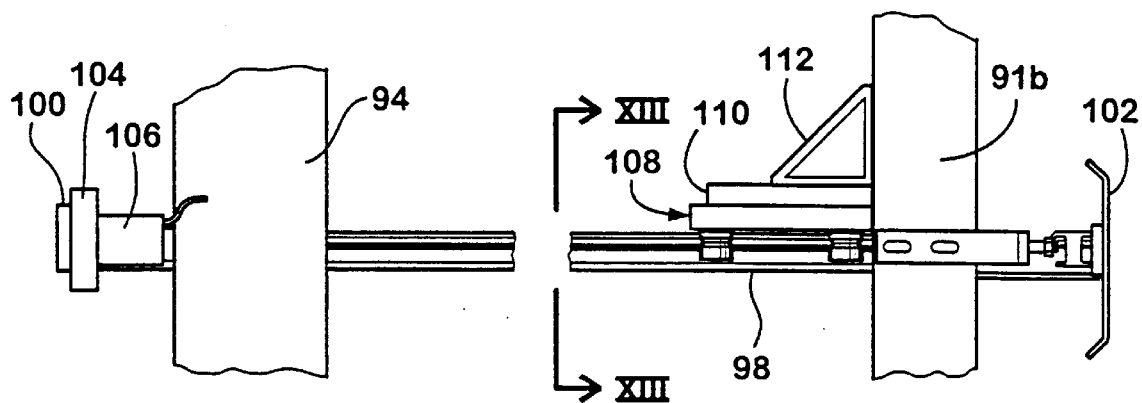
FIG. 12 is an enlarged partial elevational view of a pusher assembly.
Figure 13:
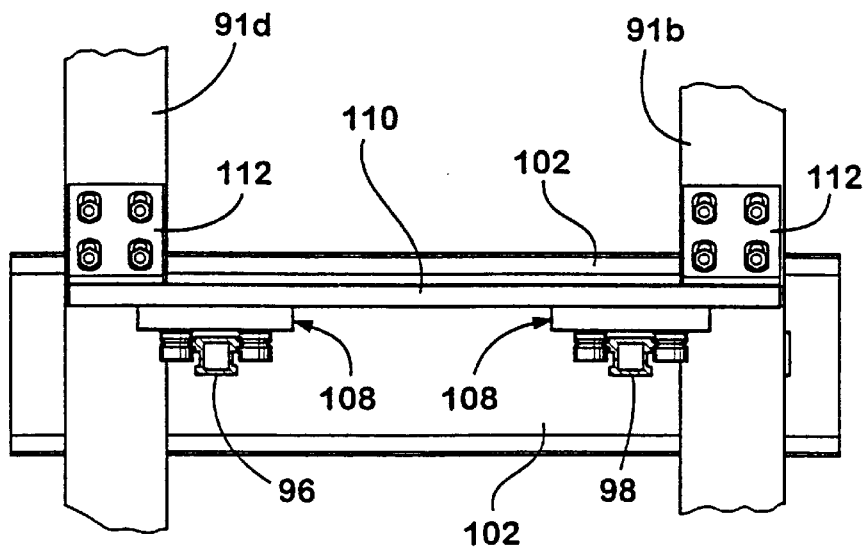
FIG. 13 is a sectional view taken along line XIII—XIII of FIG. 12.

As best seen in FIGS. 5 and 7, shelf elements 44 are coupled to and driven by a pair of spaced apart drive chains 46 and 48. Drive chains 46 and 48 are preferably endless drive chains and extend between upper and lower spaced apart drive sprockets 50, 52, and 54, 56. Upper drive sprockets 50 and 52 and lower drive sprockets 54 and 56 are respectively rotatably coupled together by shafts 57, with upper drive shafts 50 and 52 driven by a motor 59. Motor 59 is preferably a servo motor with a horsepower in the range of approximately 5 to 7.5 hp. Upper drive sprockets 50, 52 are rotationally mounted to an upper end of side walls 38, 40, and lower drive sprockets 54, 56 are rotationally mounted to a lower end of side walls 38, 40 so that as chains 46 and 48 are driven by motor 59 through drive sprockets 50, 52, 54, and 56, shelf elements 44 are moved along the continuous path of the drive chains 46 and 48 about frame 36. Preferably, drive chains 46 and 46 moves the shelf elements at a speed in the range of about 0 to 60 feet per minute. Shelf elements 44 may be coupled to endless chains 46 and 48 by a plate or an extension pin, which provides lateral and vertical support to the shelf element as well as a moment support. Preferably, each shelf element 44 is coupled to the endless chains 46 and 48 by a pair of T-shaped brackets 60 (FIG. 8). Brackets 60 each include a base portion 62 connecting to an underside of shelf element 44 and a guide portion 64, which is coupled to respective links of endless chains 46 and 48 by a coupler 65. A pair of spaced apart guide bearings 66 are supported on guide portion 64 for guiding shelf elements 44 along frame 36, as will be described in more detail below. Preferably, guide bearings 66 comprise rollers. More preferably, guide bearings 66 comprise low friction wheels. It should be understood from the foregoing that shelf elements 44 may be driven by a single chain, positioned on either side of frame 36 of lift assembly 18 or centrally located in frame 36. Furthermore, shelf elements 44 may be driven by a belt or pair of belts.

In order to maximize the width of shelf elements 44 and to minimize the gap between shelf elements 44 and the carousel's shelves 34, base portions 62 of T-shaped brackets 60 are secured to the underside of the shelf element 44 inward from the shelf element's distal side edges 44b. In this manner, the width of frame 36 may be commensurate in width to the width of shelf elements 44 or less than the width of the shelf elements 44, so that lift assembly 18 may be positioned in relatively close relationship to carousel 12. In this manner the gaps between the shelf elements 44 of lift assembly 18 and storage shelves 34 of carousel 12 are minimized. Preferably, the gaps between side edges 44b of shelf elements 44 and the distal edges 34b of storage shelves 34 are no more than ½ inch. By minimizing the gaps, the frequency of jammed articles/containers is significantly reduced.

Referring to FIGS. 5, 7, and 8, guide bearings 66 engage a pair of spaced apart continuous tracks 67, which are provided on side walls 38 and 40 of frame 36. Each track 67 includes outer and inner rails 68 and 69, which are respectively secured along edge portions 38a and 40a of side walls 38 and 40 by welding or conventional fasteners, such as bolts, rivets, or screws, or the like. Outer rails 68 are secured to outer sides of edge portions 38a and 40a of side walls 38 and 40, and inner rails 69 are secured to inner sides of edge portions 38a and 40a. In order to provide a continuous track, outer rails 68 and inner rails 69 are respectively interconnected by semicircular track portions 76. Track portions 76 each include outer and inner semicircular rails 78 and 80 and semicircular plate support members 82, which are secured to the respective top and bottom ends 38b and 40b of side walls 38 and 40 by welds or fasteners or the like. Collectively, rails 68, 69, 78 and 80 define a pair of continuous tracks 67 so that shelf elements 44, guided by guide bearings 66 and driven by motor 59, circumvent frame 36 to define a delivery side on one side of frame 36, where loaded shelf elements 44 are aligned with empty carousel storage shelves 34, and a receiving side, where empty shelf elements 44 are aligned with loaded carousel storage shelves 34 for receiving containers from the carousel 12.

As best seen in FIG. 7, articles/containers 11 are delivered to lift assembly 18 via incoming conveyor 14, which delivers packages adjacent a free edge 44c of an empty shelf element 44, and are received from lift assembly 18 by an outgoing conveyor 16, which is positioned adjacent free edge 44c of a loaded shelf element 44. Preferably, incoming and outgoing conveyors 14 and 16 are aligned with the upper shelf elements 20 on the delivery and receiving sides of lift assembly 18, respectively. In this manner, as previously described, the length of the individual storage carousels may be increased as they are no longer confined by the conventional power conveyors, which traverse through the warehouse at or near ground level and which limit the horizontal span of the carousels. It should be understood that conveyors 14 and 16 are conventional and may comprise power conveyors, belt conveyors, roller conveyors, a combination thereof, or the like.

When package/container 11 is delivered to lift assembly 18 by incoming conveyor 14, the force of incoming conveyor 14 may be sufficient to permit container 11 to slide off incoming conveyor 14 on to the empty shelf element 44, which is aligned with the end of conveyor 14. Otherwise, as described previously, container 11 may be pushed onto empty shelf element 44 by package pusher 25. After container 11 has been delivered and slid onto the empty support element 44, motor 59 is energized so that drive sprockets 50, 52, 54, and 56 simultaneously drive endless chains 46 and 48 to move the loaded shelf element 44 to the next position, just below incoming conveyor 14 so that another container 11 may be delivered and loaded on lift assembly 18. The process preferably continues until all shelf elements 44 on the delivery side of the lift assembly 18 are loaded with container 11. While reference is made to a single container 11, it should be understood that articles or containers of varying dimensions, shape, and weight can be simultaneously delivered and retrieved using delivery and retrieval system 10.

To unload containers 11 from lift assembly 18 onto carousel 12, injection pusher assembly 22 is positioned adjacent the delivery side of the lift assembly 18 and actuated to slide packages/containers from the loaded shelf elements 44 onto the respective empty storage shelves of carousel 12. Second pusher assembly 24, which is aligned with the receiving side of the lift assembly 18 behind the carousel 12, is actuated to push selected articles/containers 11 that are positioned on a storage shelf or shelves 34 of the carousel 12 onto empty shelf elements 44 on the receiving side of lift assembly 18. Once transferred, package driver device 25 is actuated to slide the respective containers on the uppermost shelf elements 20 of lift assembly 18 onto outgoing conveyor 16. In a similar manner to the loading of lift assembly 18, lift assembly 18 is unloaded with packages 11 received from carousel 12. After the uppermost shelf element 20 is unloaded, motor 59 is energized to move the upper most shelf element 20 from the receiving side of lift assembly 18 to the delivery side to eventually move the lowermost loaded shelf element 20' to the upper end of lift assembly 18 to align the last container with outgoing conveyor 16 so that all the retrieved packages can be unloaded off the lift assembly 18.

Figure 6:
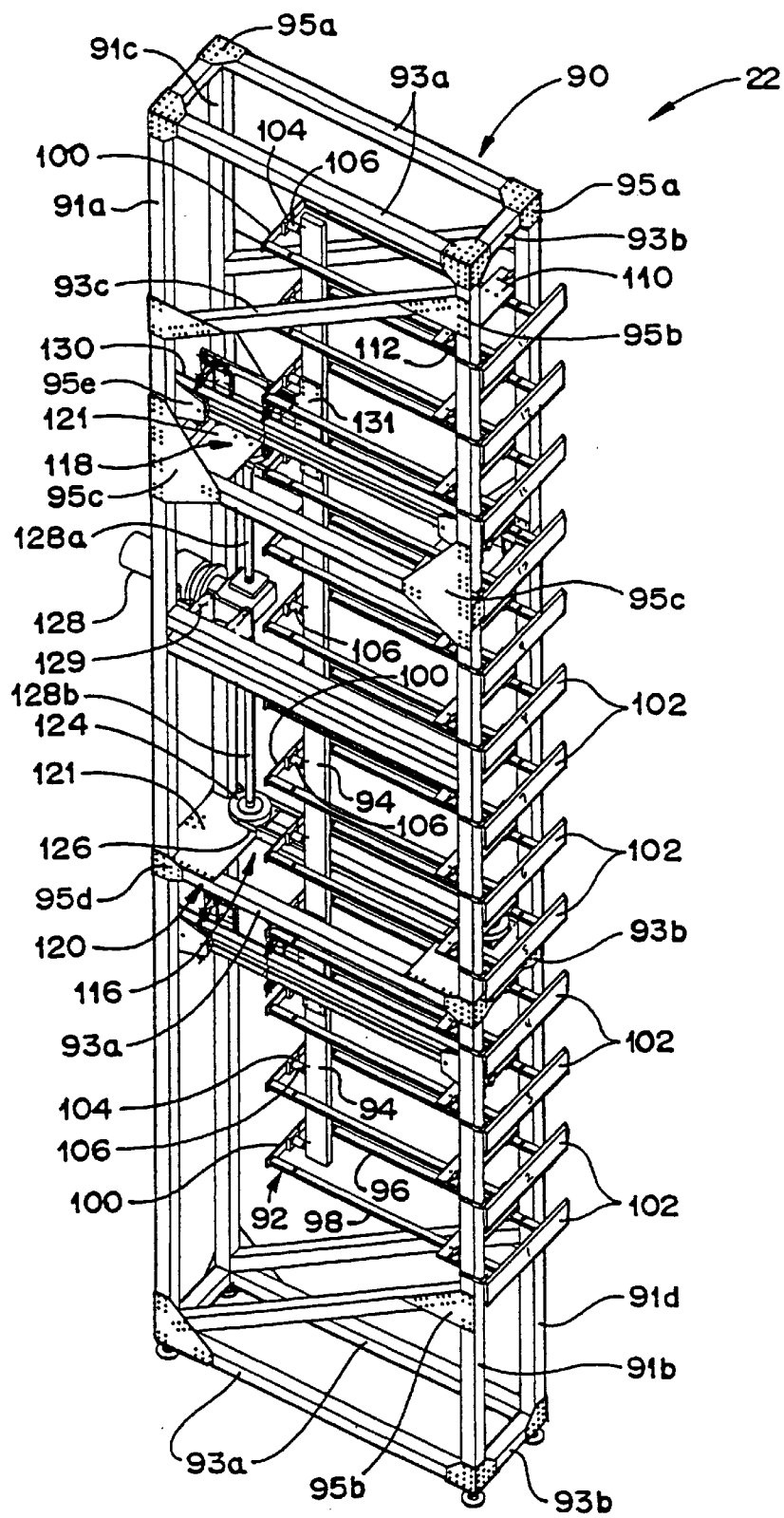
FIG. 6 is a perspective view of the injector pusher assembly, the ejector pusher assembly being identical thereto.

First and second pusher assemblies 22 and 24 are preferably of similar construction and, therefore, only a detailed description of first pusher assembly 22 is provided herein and reference is made thereto for details of second pusher assembly 24. First pusher assembly 22 includes a frame 90 and a plurality of pusher frames 92, which are supported by frame 90 and driven by a driver member 94. As best seen in FIG. 6, frame 90 includes a plurality of column members 91a, 91b, 91c, and 91d and a plurality of bracing members 93a, 93b, 93c, which are interconnected together by beam plate members 95a, 95b, 95c, 95d, and 95e to provide a rigid frame structure. Each pusher frame 92 comprises a pair of rails 96 and 98, which are interconnected by a cross beam member 100 at one end and by a pusher plate member 102 at the other end. Preferably rails 96 and 98 comprise linear bearing rails so that pusher frame 92 provides a low frictional sliding pusher frame. Each pusher frame 92 further includes a mounting plate 104, which is secured to a central portion of cross beam member 100. Mounting plate 104 supports a coupler 106, which couples pusher frame 92 to driver beam 94 through a contact plate 94a', which is welded or otherwise secured to driver beam 94. Preferably, couplers 106 comprise releasable couplers, for example a magnetic coupler, such as magnetic stainless steel, which releasably couples the pusher frame 92 to drive member 94. More preferably, releasable couplers 106 comprise selectively, releasable couplers, for example electromagnetic couplers which may by selectively energized or de-energized to selectively couple or decouple pusher frames 92 to driver member 94. As best seen in FIGS. 10–13, rails 96 and 98 are supported by carrier assemblies 108, which are mounted to frame 90 by horizontal support members 110. Horizontal support members 110 are secured to frame 90 between columns 91b and 91d by angled brackets 112. In this manner, the supporting structure for pusher frames 92 provides further rigidity to frame 90. Carrier assemblies 108 are preferably bearing assemblies to provide a low friction sliding connection between pusher frame 92 and the frame 90 of pusher assembly 22. Where linear bearings are used as rails 96 and 98, rails 96 and 98 provide an enhanced low friction sliding connection, while still providing rigidity to the pusher frame 92.

Figure 14:
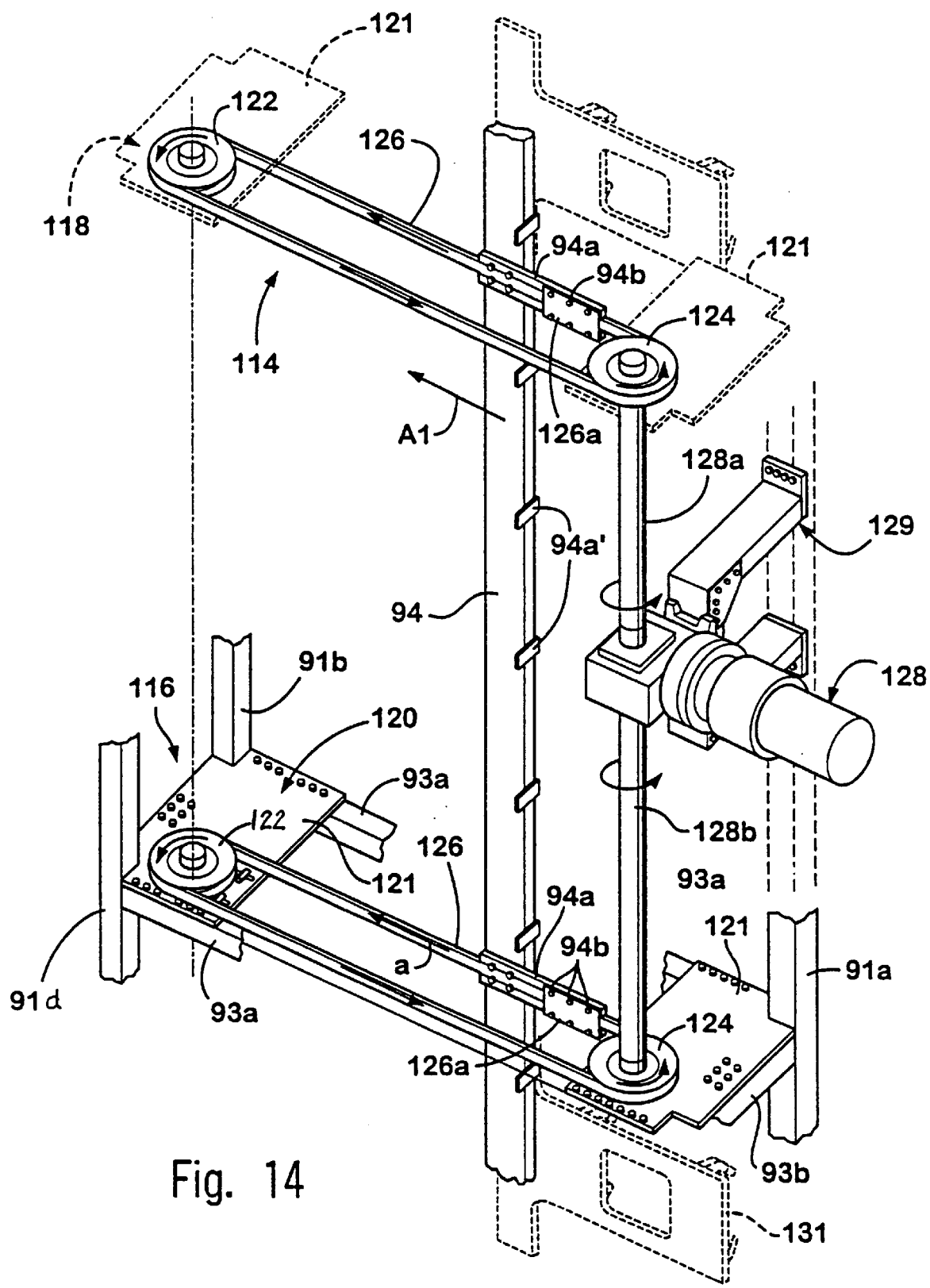
FIG. 14 is an enlarged perspective view of a driver beam and driver pulley assemblies.

Drive member 94 comprises an aluminum extrusion. Other structural members may be used, however, for example a structural steal beam. Drive member 94 is driven by a driver assembly 113, which includes a pair of spaced apart pulley assemblies 114 and 116. Pulley assemblies 114 and 116 are supported by frame 90 by intermediate spaced platforms 118 and 120. Intermediate platforms 118 and 120 are formed by beam members 93a, which span horizontally between respective column members 91a and 91b and 91c and 91d, and include plate members 121. Plate members 121 extend between beam members 93a and are secured to beam members 93a and 93b to provide support for drive assembly 113. Platforms 118 and 120 provide support and mounts for pulley assemblies 114 and 116, which move driver member 94 between a first position (shown in FIG. 14) and a second position (direction indicated by arrow A1) for driving pusher frames 92 in and out of frame 90. Pulley assemblies 118 and 120 each include a pair of spaced apart drive pulleys 122 and 124 and a belt 126 extending therebetween. Belts 126 are respectively coupled to driver member 94 at two vertical spaced locations by friction plates 126a, which hold belt 126 against a spacer arm 94a by way of fasteners 94b so that when drive pulleys 122 and 124 are driven, belts 126 move driver beam 94 from the first position, where pusher frames 92 are at least substantially retracted into the pusher assembly 22, to the second position, where pusher frames 92 are extended from frame 90, such that the respective pusher members 102 are fully extended over shelf elements 44 of lift assembly 18. Preferably, pulleys 122 and 124 are driven by a pair of motor drive shafts 128a and 128b, which extend upwardly and downwardly, respectively, from a motor 128. As best seen in FIG. 14, motor 128 is supported on frame 90 by a motor mount 129.

It should be understood that when electromagnetic couplers are used, then only those pusher members 102 on pusher frames 92 with energized electromagnetic couplers 96 will be pulled along with the driver member 94 to extend over the shelf element 44. And of those pusher frames, only those pusher members 102 that are unimpeded by jammed articles/containers are moved by driver member 94. In a similar fashion, if the electromagnetic coupler is not magnetized then the respective pusher frame 92 will remain in place and will not be pulled by the driver member 94. Similarly, when conventional magnetic couplers are used, then only those pusher bar members 102 on pusher frames 92 that are unimpeded by jammed articles/containers will be moved by driver member 94. The electromagnetic and magnetic couplers, therefore, provide a fuse so that if an article/container on a shelf element 44 of lift assembly 18 or on a shelf 34 of carousel 12 becomes jammed and the force required to push the container off the shelf element 44 or shelf 34 exceeds the magnetic attraction forces of the associated magnetic coupler, the associated pusher frame will decouple from driver member 94. In this manner, the magnetic and electromagnetic couplers provide safety mechanisms and prevent the container from being crushed or other equipment from being damaged. Preferably, magnetic and electromagnetic couplers 96 have a magnetic attraction force in a range from about 80 pounds to 120 pounds.

Figure 15A:
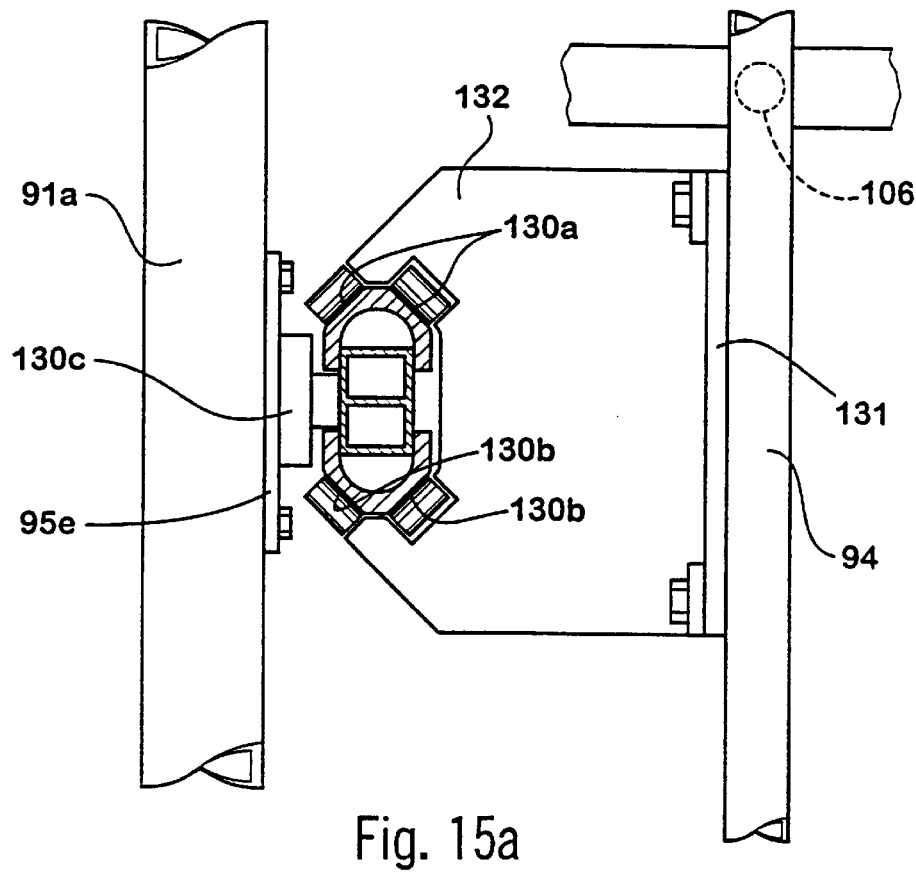
FIG. 15A is a partial elevational view of the driver beam and a driver beam support.
Figure 15B:
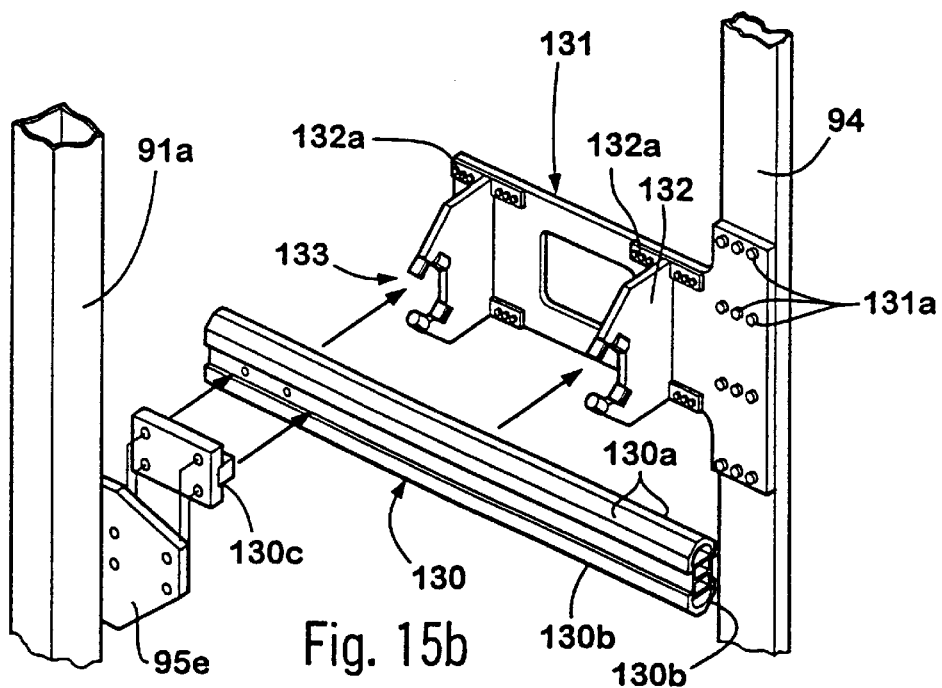
FIG. 15B is a perspective view of the driver beam support.

Referring to FIGS. 2, 6, and 15B, driver member 94 is supported in frame 90 on a pair of vertically spaced rails 130, which are mounted to frame 90 on beam plate members 95e by mounting brackets 130c. Rails 130 provide vertical and lateral restraint for driver member 94 but permit transverse movement of driver member 94 from its first position to its second position. Driver member 94 is supported on rails 130 by a pair of plate brackets 131. As best seen in FIG. 15B, plate brackets 131 are secured on one end to driver member 94 by fasteners 131a or the like and include a pair of roller mounting brackets 132, each roller mounting bracket 132 securing to a cantilevered portion of plate bracket 131 by fasteners 132a or the like and supporting a set of bearings 133. Bearings 133 engage upper and lower surfaces 130a and 130b of rails 130. Upper and lower surfaces 130a and 130b each include angled bearing surfaces to provide vertical and lateral support to driver member 94. It can be understood that driver member 94 is unrestrained along the longitudinal axes of the rails and can freely translate from its first position wherein all pusher frames 92 are retracted in frame 90 of injection assembly 22 to its second position where coupled pusher frames 92 are moved to push articles/containers supported on respective shelf elements 44 of lift assembly 18 onto respective shelves 34 of carousel 12. It should be also understood from the foregoing that any sliding arrangement can be used to support driver member 94 in frame 90. For example, bearings 133 may comprise wheels or rollers or other conventional bearing assemblies. Furthermore, rails 130 may include generally vertical and horizontal roller bearing surfaces to provide the vertical and lateral support for driver member 94.

As described above, articles/containers 11 are pushed off uppermost support element 20 of lift assembly 18 onto outgoing belt conveyor 16 by package driver device 25. As best seen in FIGS. 4, 5, and 7, package driver device 25 includes a frame 140, which is supported from frame 36 of lift assembly 18 by at least one support member 140a. Frame 140 provides a mount for a drive system, which includes two sets of pulleys 141 and 142 and pulley chords/cables 143 and 144. Coupled to pulley cables 143 and 144 is a pusher member 145 with a projecting arm 146 for pushing the respective containers off the uppermost shelf element 20 of lift assembly 18 onto outgoing conveyor 16. Projecting arm 146 is preferably braced by angled members 147 and driven around paths 148 and 149, defined by pulley cables 143 and 144, by pulleys 141 and 142. As pusher member 145 is driven around paths 148 and 149, projecting arm 146 initially projects through guide member 150 to insert between container 11, which is positioned on uppermost shelf element 20, and frame 90. Guide member 150 guides projecting arm 146 in a generally horizontal plane between its full retracted position adjacent a first side of uppermost shelf element 20 to a fully extended position over the shelf element adjacent the first side of uppermost shelf element 20 and then to a second fully extended position on the other side of shelf element 20 and then to a retracted position adjacent the other side of uppermost shelf element 20 and then finally back to the first retracted position. As pulleys 141 and 142 move pusher member 145 along paths 148 and 149, projecting arm 146 translates across uppermost shelf element 20 to a position adjacent free edge 44c of uppermost shelf element 20 so that container 11 is slid off the support surface 44a provided by uppermost shelf element 20 and onto outgoing conveyor 16 in the direction indicated by A. After container 11 is slid off uppermost support element 20, pulleys 141 and 142 continue to move pusher member 142 along paths 148 and 149 to retract projecting arm 146 from the uppermost support element 20, so that uppermost shelf element 20 is free to move along the continuous path of the drive chains 46 and 48. Package driver device 25 is a similar design to a unit commercially available from Mannesmann Demag Fördertechnik (MDF) of Germany.

As best seen in FIG. 4, pusher assembly 22 is positioned adjacent lift assembly 18 in relatively closed proximity so that the pusher bar members 102 in their retracted position just clear the edge of the respective support elements 44 but in their extended position extend substantially across the width of the support element 44. Pusher assembly 24, on the other hand, is preferably positioned on the inside of carousel 12 along side 31 so that containers 11 on the carousel storage shelves 34 may be pushed from the carousel 12 onto the receiving side of the lift assembly 18 by respective pusher frames 92 of pusher assembly 24. Again, it should be understood that when couplers 96 of pusher assembly 24 comprise electromagnetic couplers, then selected packages 11 may be pushed off carousel 12 onto lift assembly 18. Otherwise, absent a jammed package all the packages on the respective shelves 34 of carousel 12 will be pushed off the carousel 12 onto respective shelf elements 44 of lift assembly 18.

As described previously, lift assembly 18 includes a lift frame 36 and a brace frame 37. Lift frame 36 is preferably elevated by brace frame 37 so that shelf elements 44 clear the ground level G as they are driven around the continuous loop defined by drive clains 46 and 48. Alternatively, lift assembly 18 may be positioned over a pit so that the lowermost shelf element 20' is relatively close to the ground support surface G. Therefore, preferably the pit dimensions provide sufficient clearance for a shelf element so that shelf elements 44 move around frame 36 unrestricted. Brace frame 37 is generally A-shaped with a base 154, which is anchored to the ground support surface, such as a floor of the warehouse, by a plurality of anchor bolts or the like, and a vertical frame portion 156, which is connected to base 154 by welding or fasteners or the like. Vertical frame portion 156 comprises a pair of columns 158 and a pair of angled braces 160, each interconnected by cross brace members 162 and 164. Columns 158 are interconnected with angled braces 160 by cross brace members 166. Lift frame 36 is supported by a plurality of the cross brace members 162 and secured thereto by mounting plates 168. It should be understood that the vertical position of lift frame 36 can be adjusted by moving the points of connection up or down side 38 of frame 36. In this manner, the height of the carousel can be accommodated and, where a pit is provided, the height of the lift assembly 18 can be reduced by lowering the lower end shelf element's path into the pit.

Figure 16:
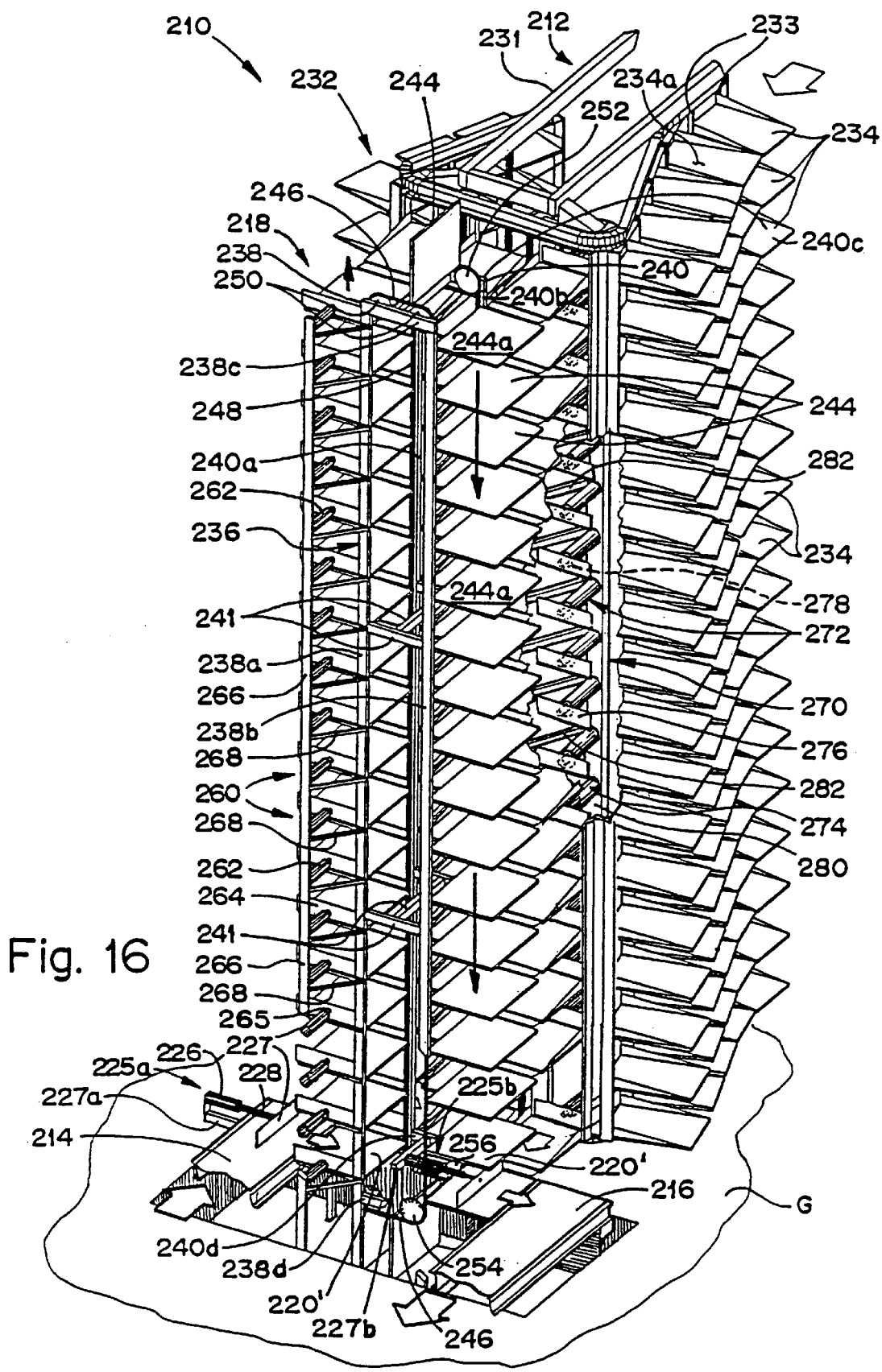
FIG. 16 is a perspective view of an alternative embodiment of an active high volume storage system according to the invention.

As best seen in FIG. 16, a second preferred embodiment of a delivery and retrieval system 210 includes a lift assembly 218 positioned adjacent a carousel 212 at a "dog-bone" shaped end 231 of the carousel. Carousel 212 is similar to carousel 12 and may comprise a continuously moving carousel or a carousel that indexes and stops at a retrieval or delivery location to align selected shelves of the carousel with a retrieval or delivery device. Furthermore, carousel 212 may include a plurality of columns each supporting a plurality of shelves, which define horizontal tiers and wherein the columns of the carousel are individually indexed to stop at the retrieval or delivery location. For illustrative purposes only, delivery and retrieval system 210 is described in the context of a moving carousel 212 having a plurality of vertical columns 233, each column 233 having a plurality of spaced apart storage shelves 234, which are arranged to form a plurality of vertically spaced tiers.

Containers 11 are delivered to lift assembly 218 by an incoming conveyor 214 and received from lift assembly 218 by an outgoing conveyor 216. As best seen in FIG. 16, incoming and outgoing conveyors 214 and 216 are positioned at ground level to deliver packages to and receive packages from the lower most shelf elements 220' on the delivery and receiving sides of lift assembly 218, respectively. Each conveyor 214, 216 includes a conveyor package driver 225a and 225b associated with it to push the packages off incoming conveyor 14 onto the lowermost shelf element 220' and for pushing packages off lowermost shelf element 220' onto outgoing conveyor 216. Preferably, conveyor package drivers 225a and 225b comprise conventional pneumatic cylinders 226 with pusher elements 227 secured to the piston rod 228 of cylinders 226 so that when the cylinders are actuated, pusher elements 227 are extended from a retracted position adjacent one side of conveyor 214 or lowermost shelf element 220' to an extended position adjacent the other side of conveyor 214 or shelf element 220'. The fixed end of cylinder 225a is supported by a support beam 227a cantilevered from conveyor 214. The fixed end of cylinder 225b is supported by a support beam 227b, which is fixed to lift assembly 218.

Lift assembly 218 is a similar construction to lift assembly 18 in that it includes a lift frame 236 and a plurality of shelf elements 244 supported by the frame 236 and driven around a continuous path on a drive system 245. Frame 236 comprises spaced apart side walls 238 and 240, which are interconnected by brace member 241 to from a rigid frame structure. Each side wall 238, 240 comprises a pair of vertical columns 238a, 238b and 240a, 240b, which are interconnected by brace members 241. Drive system 245 comprises a pair of drive chains 246 and 248 and upper and lower drive sprockets 250, 252, 254, and 256 for driving drive chains 246 and 248 in the continuous path that loops around frame 236. Upper drive sprockets 250 and 252 are supported on upper cross members 238c, 240c of opposed side walls 238 and 240. Similarly, lower drive sprockets 254 and 256 are supported on lower cross members 238d, 240d of side walls 238 and 240. Drive sprockets 250, 252, 254, and 256, are driven by a motor (not shown), for example, a servo motor. Shelf elements 244 are coupled to the drive chains 246 and 248 so that when the motor is actuated shelf elements 244 move up and down lift assembly 218 in a continuous loop around frame 236, defining a delivery side on one side and a receiving side on the other side of lift assembly 218.

As best seen in FIG. 16, lift assembly 218 further includes an injection container driver comprising a plurality of injection package pushers 260. Each injection package pushers 260 preferably comprises a pneumatic cylinder 262 and includes a pusher member 264 secured to a piston rod 265 of cylinder 262, which is extended and retracted in and out of cylinder 262 for pushing containers 11 off shelf elements 244 and onto shelves 234 of carousel 212. Package pushers 260 are supported by frame 236 on a vertical column member 266, with the fixed ends of cylinders 262 secured to vertical column member 266 at intervals equal to the spacing between shelf elements 244 so that each shelf element includes a designated package pusher. Vertical column member 266 is secured to the side wall of lift assembly 218 opposite the carousel 12, for example on side wall 238, by a plurality of struts 268. Struts 268 are preferably secured to vertical column member 266 at spaced intervals and, preferably, in close proximity to the respective fixed ends of cylinders 262. The other ends of struts 268 are secured to vertical columns 238a of side wall 238.

An ejection container driver 270 is provided on carousel 212. Ejection container driver 270 comprises a plurality of ejection package pushers 272, which are aligned with respective shelves 234 of carousel 212. Each ejection package pusher comprises a cylinder 274 and a pusher member 276 mounted to a piston rod 278 of the cylinder. Preferably, cylinders 274 comprise pneumatic cylinders. Cylinders 274 are commonly mounted on a vertical column member 280, which is supported on carousel 212 by a plurality of struts 282.

In operation, lift assembly 218 is loaded with articles/containers 11 from incoming conveyor 214. After a package/article/container 11 is delivered to lowermost horizontal shelf element 220', drive sprockets 50, 52, 54, 56 are driven to move shelf elements 244 upward to position the next empty shelf element 244 at the lowermost horizontal position to receive a container 11. This process is preferably continued until lift assembly 218 is completely loaded with containers 11. Once filled, injection package pushers 260 are actuated as a group or individually to load containers 11 onto shelves 234 of carousel 212. Selected stored containers are pushed off carousel 212 onto the empty receiving support surfaces 244a on the receiving side of lift assembly 218 by ejection package pushers 272. In a similar manner, ejection package pushers 272 may be actuated as a group or individually. Preferably, ejection pushers 272 are selectively, individually actuated. Ideally, when delivery shelf elements 44 are unloaded, receiving shelf elements 244 are loaded to increase the efficiency of the retrieval system 210.

As best seen in FIG. 16, end 232 of carousel 212 comprises a flared end so that a minimum of three shelves 234 can be aligned and positioned adjacent lift assembly 218. In this manner, lift assembly 218 can be positioned so that the delivery side of lift assembly is aligned with a first column of shelves 234 and the receiving side of lift assembly 218 can be aligned with a second column of shelves 234. Lift assembly 218 may alternatively be positioned adjacent a side 231 of carousel 212.

Storage and retrieval systems 10 and 210 are both preferably controlled by a computer (not shown). The computer controls the delivery, sequencing, positioning, locating of the articles/packages/containers 11, and actuation of injection and ejection pushers 92, 260, and 272, lift assemblies 18, 218, and carousels 12 and 212 so a container 11 can be tracked from the time when it is delivered to the warehouse to the time when it is delivered from the warehouse.

Although only a few embodiments of the present invention have been described herein, it should be understood that the present invention may be embodied in many other specific forms without departing from the scope or spirit of the invention. Particularly it should be noted that the specific mechanisms described herein may be varied widely to accomplish the same functions in accordance with the invention. For example, carousels 12 may comprise indexing carousels, which index and stop at delivery and retrieval locations. Furthermore, carousel 12 may comprise a plurality of columns with each column adapted to individually index and stop at a delivery and retrieval location. Moreover, while the invention is illustrated in the context of a carousel, lift assembly 18 and injection/ejection assemblies 13 have application with other storage devices; such as a storage rack, in which case either the storage rack or the lift assembly 18 and injection/ejection assemblies 13 are moveable so that full access to the storage rack shelves is provided. Furthermore, the control systems could be varied widely in accordance with the various aspects of the invention. Therefore, the present examples and embodiments are to be considered as illustrative and not restrictive, and the invention is not to be limited to the details given herein, which may be modified within the scope of the appended claims.

We claim the exclusive property or privilege in the embodiments of the invention defined as:

1. An active high volume storage and retrieval system comprising:
    a storage device having a plurality of spaced apart, horizontal storage tiers;
    a lift having a plurality of article supports for supporting articles to be delivered to or to be received a first conveyor device;
    a first conveyor for delivering articles to said article supports of said lift;
    a second conveyor for receiving articles from said article supports of said lift;
    a first article transfer device disposed adjacent said lift, said first article transfer device having a plurality of injection pushers for pushing containers from said lift onto selected horizontal storage tiers of said storage device; and
    a second article transfer device disposed adjacent said storage device, said second article transfer device having a driver beam and a plurality of ejection pushers, each ejection pusher aligned with one of said horizontal tiers, said driver beam adapted for movement between a first position and a second position, said plurality of ejection pushers releasably coupled to said driver beam such that when said driver beam is moved to said second position any of said ejection pushers coupled to said driver beam push the article on the associated horizontal tier onto one of said article supports.

2. An active high volume storage and retrieval system according to claim 1, wherein at least one of said ejection pushers is selectively, releasably coupled to said driver beam.

3. An active high volume storage and retrieval system according to claim 1, wherein said ejection pushers are releasably coupled to said driver beam by a magnetic coupler.

4. An active high volume storage and retrieval system according to claim 1, wherein said ejection pushers are adapted to be individually actuated to couple or decouple from said driver beam such that when any one of said ejection pushers is coupled to said driver beam and said driver beam is moved to said second position, said coupled ejection pusher is moved for pushing an article supported by the associated horizontal tier from said storage device onto said lift.

5. An active high volume storage and retrieval system according to claim 4, wherein said ejection pushers are selectively, releasably coupled to said driver beam by an electromagnetic coupler.

6. An active high volume storage and retrieval system according to claim 1, wherein said second article transfer device includes a transfer frame, said driver beam and said ejection pushers being supported by said transfer frame.

7. An active high volume storage and retrieval system according to claim 6, wherein each of said ejection pushers includes at least one linear bearing track, said ejection pushers being supported on said linear bearing tracks, said driver beam moving said ejection pushers in and out of said transfer frame on said linear bearing tracks.

8. An active high volume storage and retrieval system according to claim 6, wherein said transfer frame is vertically positionable to allow use of said storage and retrieval system with a ground support surface with or without a pit.

9. An active high volume storage and retrieval system according to claim 6, wherein said transfer frame is supported by a brace frame, said brace frame for anchoring said transfer frame to a ground support surface, said brace frame including a plurality of vertically spaced, transfer frame mounts so that said transfer frame may be vertically adjusted along said brace frame for lowering or raising the lowest shelf element with respect to the ground support surface.

10. An active high volume storage and retrieval system according to claim 1, wherein each of said ejection pushers includes a pusher member and a pair of linear bearing tracks having distal and proximate ends, each of said pusher members connecting to said distal ends of linear bearing tracks of a respective ejection pusher for pushing articles supported by said article supports on to said storage device.

11. An active high volume storage and retrieval system according to claim 10, further comprising a plurality of selectively, releasable couplers, each of said selectively, releasable couplers supported by said proximate ends of said linear bearing tracks of a selected ejection pusher for selectively, releasably coupling said ejection pushers to said driver beam.

12. An active high volume storage and retrieval system according to claim 1, wherein each of said ejection pushers comprises a pusher frame having first and second ends, each of said pusher frames defining a pusher member at its first end and including a releasable coupler for releasably coupling said pusher frame to said driver beam.

13. An active high volume storage and retrieval system according to claim 12, wherein each of said releasable couplers comprises an electromagnetic coupler.

14. An active high volume storage and retrieval system according to claim 1, wherein said storage device comprises a carousel.

15. An active high volume storage and retrieval system according to claim 14, wherein said carousel comprises a continuously moving carousel.

16. An active high volume storage and retrieval system according to claim 14, wherein said carousel comprises an indexing carousel.

17. An active high volume storage and retrieval system according to claim 1, wherein said lift includes a lift frame, said lift frame having a delivery side and receiving side, said lift frame moving said article supports around a continuous path to align a first group of said article supports along said delivery side to define delivery article supports and a second group along said receiving side to define receiving article supports.

18. An active high volume storage and retrieval system according to claim 1, wherein said first article transfer device includes an injection driver beam, said injection driver beam adapted for movement between a first position and a second position, each of said injection pushers aligned with one of said article supports, said plurality of injection pushers releasably coupled to said injection driver beam such that when said injection driver beam is in said first position any of said injection pushers coupled to said injection driver beam push an article on the associated article support onto one of said article supports.

19. An active high volume storage and retrieval system according to claim 18, wherein at least one of said injection pushers is selectively, releasably coupled to said injection driver beam.

20. An active high volume storage and retrieval system according to claim 18, wherein said injection pushers are releasably coupled to said injection driver beam by a magnetic coupler.

21. An active high volume storage and retrieval system according to claim 18, wherein said injection pushers are adapted to be individually actuated to couple or decouple from said injection driver beam such that when any one of said injection pushers is coupled to said injection driver beam and said injection driver beam is moved to said second position, said coupled injection pusher is moved for pushing an article supported by the associated article support of said lift onto said storage device.

22. An active high volume storage and retrieval system according to claim 21, wherein each said injection pusher is selectively, releasably coupled to said injection driver beam by an electromagnetic coupler.

23. An active high volume storage and retrieval system according to claim 18, wherein said first article transfer device includes an injection transfer frame, said injection driver beam and said injection pushers being supported by said injection transfer frame.

24. An active high volume storage and retrieval system according to claim 23, wherein each of said injection pushers includes at least one linear bearing track, said injection pushers being supported on said linear bearing tracks, said injection driver beam moving said injection pushers in and out of said injection transfer frame on said linear bearing tracks.

25. An active high volume storage and retrieval system comprising:

a storage carousel having a plurality of storage tiers;

a lift positioned adjacent said storage carousel, said lift having a lift frame, a brace frame supporting said lift frame, and a plurality of article supports for supporting articles to be delivered to or to be received from said storage carousel, said lift raising and lowering said article supports to align at least one of said article supports with one of said storage tiers, said lift frame having an outermost frame width, each of said article supports having opposed free edges and an article support width, said article supports being supported inwardly of said opposed free edges, and said outermost frame width being less than or equal to said article support widths so that said article supports can be positioned in close proximity to said storage tiers;

a plurality of article transfer devices, a first group of said article transfer devices being positioned adjacent said storage tiers for moving articles stored thereon onto said article supports, a second group of said article transfer devices positioned adjacent said article supports for moving articles supported thereby onto said storage tiers;

a first conveyor section for delivering articles to said article supports of said lift; and a second conveyor section for receiving articles from said article supports of said lift.

26. An active high volume storage and retrieval system according to claim 25, wherein said lift frame includes a driving device for raising and lowering said article supports, said driving device moving said article supports in a continuous path around said lift frame.

27. An active high volume storage and retrieval system according to claim 25, wherein said driving device includes a servo motor for driving said article supports around said continuous path.

28. An active high volume storage and retrieval system according to claim 25, wherein said lift frame supports a continuous drive chain for raising and lowering said article supports, said drive chain defining a continuous loop around said lift frame, a delivery side on one side of said lift frame, and a receiving side on another side of said lift frame.

29. An active high volume storage and retrieval system according to claim 28, said article supports coupling to said drive chain such that when said drive chain is driven, said article supports travel around said lift frame along said continuous path defining delivery article supports when aligned on said delivery side and receiving article supports when aligned on said receiving side.

30. An active high volume storage and retrieval system according to claim 25, wherein said lift frame includes a pair of spaced apart tracks, said tracks extending around said lift frame along a continuous path defining a delivery side on one side of said lift frame and a receiving side on another side of said lift frame, said article supports adapted to be guided around said continuous path on said track to align a first group of said article supports on said delivery side of said lift frame and a second group of said article supports on said receiving side of said lift frame.

31. An active high volume storage and retrieval system according to claim 25, wherein each of said article supports comprises a shelf element.

32. An active high volume storage and retrieval system according to claim 25, wherein each of said article transfer devices comprises a pusher.

33. An active high volume storage and retrieval system comprising:

a storage carousel having a plurality of horizontal storage tiers;

a lift positioned adjacent said storage carousel, said lift having a lift frame and a plurality of article supports for supporting articles to be delivered to or to be received from said storage carousel, said lift raising and lowering said article supports to align at least one of said article supports with one of said horizontal tiers, said lift frame having a frame width, each of said article supports having an article support width wherein said frame width is less than or equal to said article support widths so that said article supports can be positioned in close proximity to said horizontal storage tiers;

a plurality of article transfer devices, a first group of said article transfer devices positioned adjacent said horizontal storage tiers for pushing articles stored thereon onto said article supports, a second group of said article transfer devices positioned adjacent said article supports for pushing articles supported thereby onto said horizontal storage tiers;

a first conveyor section for delivering articles to said article supports of said lift;

a second conveyor section for receiving articles from said article supports of said lift; and wherein said horizontal tiers each include a tier free-edge, each of said article supports including an article support free-edge, each of said tier free-edges spaced from respective article support free-edges a distance defining a gap, at least one of said gaps being less than or equal to ½ inch.

34. An active high volume storage and retrieval system comprising:

a storage carousel having a plurality of horizontal storage tiers;

a lift positioned adjacent said storage carousel, said lift having a lift frame and a plurality of article supports for supporting articles to be delivered to or to be received from said storage carousel, said lift raising and lowering said article supports to align at least one of said article supports with one of said horizontal tiers, said lift frame having a frame width, each of said article supports having an article support width wherein said frame width is less than or equal to said article support widths so that said article supports can be positioned in close proximity to said horizontal storage tiers;

a plurality of article transfer devices, a first group of said article transfer devices positioned adjacent said horizontal storage tiers for pushing articles stored thereon onto said article supports, a second group of said article transfer devices positioned adjacent said article supports for pushing articles supported thereby onto said horizontal storage tiers;

a first conveyor section for delivering articles to said article supports of said lift;

a second conveyor section for receiving articles from said article supports of said lift; and a transfer frame, said transfer frame including a driver beam and a plurality of ejection pushers defining said second group of said transfer devices, said driver beam adapted to move from a first position to a second position, said ejection pushers releasably coupled to said driver beam such that when said driver beam is in said second position said ejection pushers push the articles on selected horizontal storage tiers onto said article supports.

35. An active high volume storage and retrieval system according to claim 34, wherein at least one of said ejection pushers is releasably coupled to said driver beam by a magnetic coupler, said magnetic coupler having a magnetic force such that when an article becomes jammed during the transfer of the article from said lift to said carousel, said magnetic coupler will decouple from said driver beam to prevent crushing of the article.

36. An active high volume storage and retrieval system according to claim 34, wherein at least one of said ejection pushers is selectively, releasably coupled to said driver beam by an electromagnetic coupler.

37. An active high volume storage and retrieval system comprising:

a storage carousel having a plurality of horizontal storage tiers;

a lift positioned adjacent said storage carousel including a lower portion, said lift having an article support assembly, said article support assembly including a plurality of article supports for supporting articles to be delivered or to be received from said storage carousel and a drive, said drive driving said article support assembly to align selected article supports with selected tiers of said horizontal tiers, said drive raising ones of said article supports upwardly in an article receiving portion of said article support assembly and lowering ones of said article supports downwardly in an article delivering portion of said article support assembly;

a first conveyor section for delivering articles to one of said article supports in said article delivering portion, said first conveyor section being substantially aligned with a portion of said lift above said lower portion;

a second conveyor section for receiving articles from one of said article supports in said article receiving portion, said second conveyor section being substantially aligned with a portion of said lift above said lower portion; and a plurality of article transfer devices for transferring articles supported on said article supports in said article delivery portion to said horizontal tiers and for transferring articles stored on said carousel to selected article supports on said article receiving portion.

38. An active high volume storage and retrieval system according to claim 37, wherein said article transfer devices are adapted for pushing articles supported on said article supports in said article delivery portion to said horizontal tiers and for pushing articles stored on said carousel to selected article supports on said article receiving portion.

39. An active high volume storage and retrieval system according to claim 38, said first conveyor section for delivering articles to an upper delivery article support in said article delivering portion, and said second conveyor section for receiving articles from an upper receiving article support in said article receiving portion.

40. An active high volume storage and retrieval system according to claim 39, further comprising at least one package driver positioned adjacent said one of said article supports in said article receiving portion and said first conveyor section for pushing articles supported on said one of said article supports and said first conveyor section onto one of said second conveyor section and said one of said article supports on said delivering portion, respectively.

41. An active high volume storage and retrieval system according to claim 40, wherein said package driver moves in a continuous path.

42. An active high volume storage and retrieval system according to claim 38, wherein each of said article supports comprises a shelf element.

43. An active high volume storage and retrieval system according to claim 38, wherein a first group of article transfer devices are supported by said lift and a second group of said transfer devices are supported by said carousel.

44. An active high volume storage and retrieval system according to claim 43, wherein each of said transfer devices comprising a pusher member and a cylinder having a piston rod, each of said pusher members supported on said piston rod of a respective cylinder.

45. An active high volume storage and retrieval system comprising:

a storage carousel having a plurality of horizontal storage tiers;

a lift positioned adjacent said storage carousel, said lift having a plurality of article supports for supporting articles to be delivered to or to be received from said storage carousel, said lift raising and lowering said article supports to align selected article supports with selected tiers of said horizontal tiers, said article supports moving upwardly in an article receiving portion and downwardly in an article delivering portion;

a first conveyor section for delivering articles to an upper article support in said article delivering portion;

a second conveyor section for receiving articles from an upper receiving article support in said article receiving portion;

a plurality of article transfer devices for transferring articles supported on said article supports in said article delivery portion to said horizontal tiers and for transferring articles stored on said carousel to selected article supports on said article receiving portion, said article transfer devices being adapted for pushing articles supported on said article supports in said article delivery portion to said horizontal tiers and for pushing articles stored on said carousel to selected article supports on said article receiving portion; and at least one package driver being positioned adjacent said upper receiving article support for pushing articles supported on said upper receiving article support onto said second conveyor section and including a pusher arm, said pusher arm adapted to move from a first retracted position adjacent said upper receiving article support to a first projecting position over one side of said upper receiving article support, to translate from said first projecting position along said upper receiving article support to a second projection position for pushing an article supported thereon onto said second conveyor section, and to move from said second projecting position to a second retracting position, and said package driver moving in a continuous path.

46. An active high volume storage and retrieval system comprising:

a storage carousel having a plurality of horizontal storage tiers;

a lift positioned adjacent said storage carousel, said lift having a plurality of article supports for supporting articles to be delivered to or to be received from said storage carousel, said lift raising and lowering said article supports to align selected article supports with selected tiers of said horizontal tiers, said article supports moving upwardly in an article receiving portion and downwardly in an article delivering portion;

a first conveyor section for delivering articles to an upper article support in said article delivering portion;

a plurality of article transfer devices for transferring articles supported on said article supports in said article delivery portion to said horizontal tiers and for transferring articles stored on said carousel to selected article supports on said article receiving portion, said article transfer devices being adapted for pushing articles supported on said article supports in said article delivery portion to said horizontal tiers and for pushing articles stored on said carousel to selected article supports on said article receiving portion;

a second conveyor section for receiving articles from an upper receiving article support in said article receiving portion; and at least on package driver positioned adjacent one of said upper receiving article support and said first conveyor section for pushing articles supported on said one of said upper receiving article support and said first conveyor section onto one of said second conveyor section and said upper delivery article support, respectively, said package driver comprising a pusher arm and a drive assembly, said drive assembly moving said pusher arm around a path from a first retracted position adjacent a first side of said upper article support to a first extended position over said upper article support, translating said pusher arm over said upper article support to a second extended position, clearing a second opposed side of said upper article support to permit said article supports to be raised or lowered, and retracting said pusher arm to a second retracted position adjacent said second side of said upper article support.

47. An active high volume storage and retrieval system according to claim 46, wherein said drive assembly includes a first set of pulleys and a second set of pulleys, each set of pulleys having a chord, each of said chords extending around the respective pulleys of a respective set of pulleys defining a closed path, said pusher arm coupled to said chords to move around said closed paths from said first retracted position to said first extended position, from said first extended position to said second extended position, from said second extended position to said second retracted position, and back to said first retracted position.

48. An active high volume storage and retrieval system a storage carousel having a plurality of horizontal storage tiers;

a lift positioned adjacent said storage carousel, said lift having a plurality of article supports for supporting articles to be delivered to or to be received from said storage carousel, said lift raising and lowering said article supports to align selected article supports with selected tiers of said horizontal tiers, said article supports moving upwardly in an article receiving portion and downwardly in an article delivering portion;

a first conveyor section for delivering articles to an upper article support in said article delivering portion or for receiving articles from an upper article support in said article receiving portion;

a plurality of article transfer devices for transferring articles supported on said article supports in said article delivery portion to said horizontal tiers and for transferring articles stored on said carousel to selected article supports on said article receiving portion, said article transfer devices being adapted for pushing articles supported on said article supports in said article delivery portion to said horizontal tiers and for pushing articles stored on said carousel to selected article supports on said article receiving portion; and wherein a first group of article transfer devices are supported by a transfer frame, said transfer frame including a driver beam, said driver beam adapted to laterally move in said frame from a non-driving position to a driving position, said first group of article transfer devices releasably coupled to said driver beam such that when said driver beam is in said driving position said first group of article transfer devices push the articles on selected horizontal storage tiers onto said article supports.

49. An active high volume storage and retrieval system comprising:

a storage carousel having a plurality of storage surfaces, said storage surfaces arranged vertically and horizontally to form a plurality of spaced apart, horizontal storage tiers;

a lift having opposed lift sides and a plurality of article supports for supporting articles to be delivered or to be received from said storage carousel, each of said article supports having opposed first and second sides, said lift driving said article supports in a continuous path to align a first group of selected article supports on one of said lift sides with a first group of selected storage surfaces whereby said first sides of said first group of selected article supports define article deliver support surfaces and a second group of article supports on the other of said lift sides with a second group of selected storage surfaces whereby said second sides of said second group of selected article supports define article receiving support surfaces of said carousel;

a first conveyor section for delivering containers to said delivery article receiving surfaces of said lift assembly;

a second conveyor section for receiving containers from said receiving article support surfaces of said lift assembly;

a first container driver disposed adjacent said delivery article support surfaces of said lift, said first container driver having a plurality of insertion pushers aligned with said delivery article support surfaces for pushing the containers from said delivery article support surfaces onto said first group of said storage surfaces, wherein said plurality of insertion pushers are vertically aligned; and a second container driver disposed adjacent said second group of said storage surfaces of said carousel, said second container driver having a plurality of ejection pushers for selectively pushing containers from said second group of storage surfaces onto said receiving article support surfaces, wherein said plurality of ejection pushers are vertically aligned.

50. An active high volume storage and retrieval system according to claim 49, further comprising a package driver positioned adjacent said lift for pushing containers being received on said receiving support surfaces onto said second conveyor section.

51. An active high volume storage and retrieval system according to claim 50, wherein said package driver moves in a continuous path.

52. An active high volume storage and retrieval system according to claim 49, wherein said lift frame includes a lift frame, said lift frame having a delivery side and a receiving side, said lift frame including a track extending around said lift frame and defining a continuous path, said article supports adapted to move along said continuous path along said track from said receiving side to said delivery side.

53. An active high volume storage and retrieval system according to claim 52, wherein said article supports comprise shelf elements, said shelf elements having a shelf width, said lift frame having a lift width, said shelf widths being approximately equal or greater than the lift width.

54. An active high volume storage and retrieval system according to claim 52, wherein each of said article supports comprise shelf elements, each of said shelf elements guided along said track by a plurality of bearings.

55. An active high volume storage and retrieval system according to claim 49, wherein said carousel includes pair of generally parallel side sections and two opposed curved end sections, said side sections and end sections forming a continuous path.

56. An active high volume storage and retrieval system according to claim 55, wherein said lift is adjacent one of said side sections.

57. An active high volume storage and retrieval system according to claim 56, wherein said lift is adjacent one of said end sections.

58. An active high volume storage and retrieval system comprising:

a storage carousel having a plurality of storage surfaces, said storage surface arranged vertically and horizontally to form a plurality of spaced apart, horizontal storage tiers;

a lift having a plurality of article supports for supporting articles to be delivered or to be received from said storage carousel, said lift raising and lowering said article supports to align a first group of selected article supports with a first group of selected storage surfaces and a second group of article supports with a second group of selected storage surfaces of said carousel, said first group of article supports defining a plurality of delivery article supports, and said second group of article supports defining a plurality of receiving article supports;

a first conveyor section for delivering containers to said delivery article supports of said lift assembly;

a second conveyor section for receiving containers from said receiving article supports of said lift assembly;

a first container driver disposed adjacent said delivery article supports of said lift, said first container driver having a plurality of insertion pushers aligned with said delivery article supports for pushing the containers from said delivery article supports onto said first group of said storage surfaces;

a second container driver disposed adjacent said second group of said storage surfaces of said carousel, said second container driver having a plurality of ejection pushers for selectively pushing containers from said second group of storage surfaces onto said receiving article supports;

a package driver positioned adjacent said lift for pushing containers being received on said receiving support surfaces onto said second conveyor section, and said package driver moving in a continuous path; and wherein said second container driver includes a driver frame and a driver beam, said driver beam adapted to reciprocate between a first position and a second position, each of said ejection pushers coupled to said driver beam such that when said driver beam is reciprocated to its second position said ejection pushers move from a retracted position in said driver frame to an extended position for pushing containers supported on said first group of storage surfaces onto said delivery support surface of said lift.

59. An active high volume storage and retrieval system comprising:

a storage carousel having a plurality of storage surfaces, said storage surfaces arranged vertically and horizontally to form a plurality of spaced apart, horizontal storage tiers;

a lift having a plurality of article supports for supporting articles to be delivered or to be received from said storage carousel, said lift raising and lowering said article supports to align a first group of selected article supports with a first group of selected storage surfaces and a second group of article supports with a second group of selected storage surfaces of said carousel, said first group of article supports defining a plurality of delivery article supports, and said second group of article supports defining a plurality of receiving article supports;

a first conveyor section for delivering containers to said delivery article supports of said lift assembly;

a second conveyor section for receiving containers from said receiving article supports of said lift assembly;

a first container driver disposed adjacent said delivery article supports of said lift, said first container driver having a plurality of insertion pushers aligned with said delivery article supports for pushing the containers from said delivery article supports onto said first group of said storage surfaces;

a second container driver disposed adjacent said second group of said storage surfaces of said carousel, said second container driver having a plurality of ejection pushers for selectively pushing containers from said second group of storage surfaces onto said receiving article supports;

a package driver positioned adjacent said lift for pushing containers being received on said receiving support surfaces onto said second conveyor section, and said package driver moving in a continuous path; and wherein said second container driver includes a driver beam, and at least one of said ejection pushers is releasably coupled to said driver beam.

60. An active high volume storage and retrieval system according to claim 59, wherein each of said ejection pushers includes a pusher frame and a pusher member disposed about one end of said pusher frame, said pusher frames coupling to said driver beam of said second container driver.

61. An active high volume storage and retrieval system comprising:

a storage carousel having a plurality of storage surfaces, said storage surfaces arranged vertically and horizontally to form a plurality of spaced apart, horizontal storage tiers;

a lift having a plurality of article supports for supporting articles to be delivered or to be received from said storage carousel, each of said article supports comprising shelf elements, said lift raising and lowering said article supports to align a first group of selected article supports with a first group of selected storage surfaces and a second group of article supports with a second group of selected storage surfaces of said carousel, said first group of article supports defining a plurality of delivery article supports, and said second group of article supports defining a plurality of receiving article supports, said lift including a lift frame, said lift frame having a delivery side and a receiving side, said lift frame including a track extending around said lift frame and defining a continuous path, said article supports adapted to move along said continuous path along said track from said receiving side to said delivery side, each of said shelf elements being guided along said track by a plurality of bearings and having opposed free-edges, said bearings aligned inward of said free-edges of respective shelf elements so that said shelf elements can be positioned in close proximity to said horizontal carousel and, thereby, minimizing gaps between said horizontal tiers and said shelf elements;

a first conveyor section for delivering containers to said delivery article supports of said lift assembly;

a second conveyor section for receiving containers from said receiving article supports of said lift assembly;

a first container driver disposed adjacent said delivery article supports of said lift, said first container driver having a plurality of insertion pushers aligned with said delivery article supports for pushing the containers from said delivery article supports onto said first group of said storage surfaces; and a second container driver disposed adjacent said second group of said storage surfaces of said carousel, said second container driver having a plurality of ejection pushers for selectively pushing containers from said second group of storage surfaces onto said receiving article supports.

62. An active high volume storage and retrieval system comprising:

a storage device having a plurality of vertically spaced horizontal storage tiers;

a lift positioned adjacent said storage device, said lift having a plurality of article supports for supporting articles to be delivered to or to be received from said storage device;

a first conveyor for delivering articles to said article supports;

a second conveyor for receiving articles from said article supports;

a first article transfer device disposed adjacent said lift, said first article transfer device having a plurality of injection pushers for pushing articles from said lift onto said horizontal tiers of said storage device; and a second article transfer device disposed adjacent said storage device, said second article transfer device having a plurality of ejection pushers for pushing articles on said horizontal tiers onto said lift, wherein at least one of said first and second article transfer devices includes a driver member, said driver member adapted to move from a first position to a second position, said plurality of pushers associated with said at least one of said first and second article transfer devices releasably coupled to said driver member such that when said driver member is moved to said second position, said plurality of pushers associated with said at least one of said first and second article transfer devices push articles supported on one of said lift and said storage device.

63. An active high volume storage and retrieval system according to claim 62, wherein said plurality of pushers associated with said at least one of said first and second article transfer devices are selectively, releasably coupled to said driver member.

64. An active high volume storage and retrieval system according to claim 62, wherein said plurality of pushers associated with said at least one of said first and second article transfer devices are coupled to said driver member by a magnetic coupler.

65. An active high volume storage and retrieval system comprising:

a storage device having a plurality of spaced apart storage tiers;

a lift having a plurality of article supports for supporting articles to be delivered to or to be received from said storage device;

a first conveyor for delivering articles to said article supports of said lift;

a second conveyor for receiving articles from said article support of said lift;

a first article transfer device disposed adjacent said lift, said first article transfer device having a first driver and at least one injection pusher coupled with said first driver for pushing articles from said lift onto selected storage tiers of said storage device; and a second article transfer device disposed adjacent said storage device, said second article transfer device having a second driver and at least one ejection pusher coupled with said second driver and aligned with one of said storage tiers for pushing articles from selected storage tiers of said storage device onto the said lift, wherein at least one of said at least one injection pusher and said at least on ejection pusher is coupled with its respective driver with a releasable coupling device.

66. An active high volume storage and retrieval system according to claim 65, wherein said first and second drivers each comprise a driver beam.

67. An active high volume storage and retrieval system according to claim 66, wherein said at least one ejection pusher is a plurality of ejection pushers which are adapted to be individually actuated to couple or decouple from said second driver such that when said second driver is moved, said coupled ejection pusher is moved with said second driver for pushing an article supported by the associated storage tier from said storage device onto said lift.

68. An active high volume storage and retrieval system according to claim 65, wherein said releasable coupling device comprises a magnetic coupler.

69. An active high volume storage and retrieval system according to claim 65, wherein said releasable coupling device comprises an electromagnetic coupler.

70. An active high volume storage and retrieval system according to claim 65, further comprising a package driver, said package driver being positioned adjacent one of said article supports and including a pusher arm, said pusher arm adapted to move from a first retracted position adjacent said one of said article supports to a first projecting position over one side of said one of said article supports, to translate from said first projecting position along said one of said article supports to a second projecting position for pushing an article supported on said one of said article supports onto said second conveyor section, and to move from said second projecting position to a second retracting position.

71. An active high volume storage and retrieval system according to claim 65, wherein each of said article supports has opposed free edges, said article supports being supported inwardly of said opposed free edges so that said article supports can be positioned in close proximity to said storage tiers and, thereby, minimizing gaps between said storage tiers and said article supports.

* * * * *

UNITED STATES PATENT AND TRADEMARK OFFICE
CERTIFICATE OF CORRECTION

PATENT NO. : 5,860,784
DATED : January 19, 1999
INVENTOR(S) : Dennis J. Schuitema and Ricardo N. Schiesser It is certified that error appears in the above-identified patent and that said Letters Patent is hereby corrected as shown below:

Column 12,
Line 54, "clains" should be -- chains --

Column 15,
Line 38, "a first conveyor device;" should be -- from side storage device; --

Column 27,
Line 6, delete "the" after "onto"
Line 8, "on" should be -- one --

Signed and Sealed this

Twenty-eighth Day of December, 2004

JON W. DUDAS
*Director of the United States Patent and Trademark Office*